United States Patent
Lammers et al.

(10) Patent No.: US 7,597,760 B2
(45) Date of Patent: Oct. 6, 2009

(54) APPARATUS AND METHOD FOR MAKING PREFORMS IN MOLD

(75) Inventors: Scott A. Lammers, Knoxville, TN (US); Jonathan W. Schacher, Lenoir City, TN (US); Christian S. Anderson, Seymour, TN (US); Steve H. Olson, Knoxville, TN (US)

(73) Assignee: Brunswick Corporation, Lake Forest, IL (US)

( * ) Notice: Subject to any disclaimer, the term of this patent is extended or adjusted under 35 U.S.C. 154(b) by 436 days.

(21) Appl. No.: 11/391,256

(22) Filed: Mar. 29, 2006

(65) Prior Publication Data

US 2006/0163772 A1    Jul. 27, 2006

Related U.S. Application Data

(62) Division of application No. 10/947,543, filed on Sep. 23, 2004.

(60) Provisional application No. 60/505,838, filed on Sep. 26, 2003.

(51) Int. Cl.
*B05B 15/02* (2006.01)
*B05B 3/00* (2006.01)
*B05C 19/00* (2006.01)

(52) U.S. Cl. .................. 118/302; 118/308; 118/323

(58) Field of Classification Search .......... 118/302, 118/300, 308, 321, 323; 239/80, 85, 132.1, 239/132.3, 139; 264/80, 109, 119, 121, 122; 156/62.2, 82, 276, 278, 279, 321, 180, 202, 156/206, 421, 422, 426; 427/180, 202, 206, 427/421, 422, 426

See application file for complete search history.

(56) References Cited

U.S. PATENT DOCUMENTS 2,489,242 A * 11/1949 Fletcher et al. ............... 65/462

(Continued)

FOREIGN PATENT DOCUMENTS

DE    1232731 B    11/1960

(Continued)

OTHER PUBLICATIONS

P4 Technology—Programmable Powdered Preform Process, Applicator System AB, Owens Corning.

*Primary Examiner*—Yewebdar T Tadesse
(74) *Attorney, Agent, or Firm*—Fitch, Even, Tabin & Flannery; Kendrew H. Colton

(57) ABSTRACT

Apparatus and a method of preparing fiber preforms disperses fibers and binder on a forming support surface such that the materials are conditioned and then applied to the surface where the composite material solidifies. Reinforcing material, such as fiber, is mixed with binder, such as thermoplastic or thermoset materials, so that the materials adhere. Then, the adhesive mixture is dispersed in a controlled pre-determined weight ratio on the support surface where the mixture sticks to the support surface, cools and solidifies. The deposited mixture can be an open mat having interstices between fibers. The deposited mixture can also be shaped further into a final desired shape before complete solidification. This method eliminates the need for solvents and their associated problems. The process does not require a vacuum or plenum system to hold the reinforcing material in place. The preform can be made in any shape, including sections or asymmetric configurations and remain in mold while being processed to a composite molded article.

10 Claims, 23 Drawing Sheets

U.S. PATENT DOCUMENTS

| | | |
|---|---|---|
| 5,034,181 A | 7/1991 | Billiu |
| 5,045,251 A | 9/1991 | Johnson |
| 5,093,059 A | 3/1992 | Nathoo et al. |
| 5,123,949 A | 6/1992 | Thiessen |
| 5,320,870 A | 6/1994 | Sorathia et al. |
| 5,413,750 A | 5/1995 | Kelman et al. |
| 5,579,998 A | 12/1996 | Hall et al. |
| 5,664,518 A | 9/1997 | Lewit et al. |
| 5,932,293 A * | 8/1999 | Belashchenko et al. ..... 427/446 |
| 6,030,575 A | 2/2000 | Barron et al. |
| 6,367,406 B1 | 4/2002 | Sahr et al. |
| 6,582,773 B2 | 6/2003 | Brynolf |
| 2002/0018860 A1 | 2/2002 | Filipppou et al. |
| 2002/0145217 A1 | 10/2002 | Boyd et al. |

FOREIGN PATENT DOCUMENTS

| | | |
|---|---|---|
| GB | 2015915 | 9/1979 |

* cited by examiner

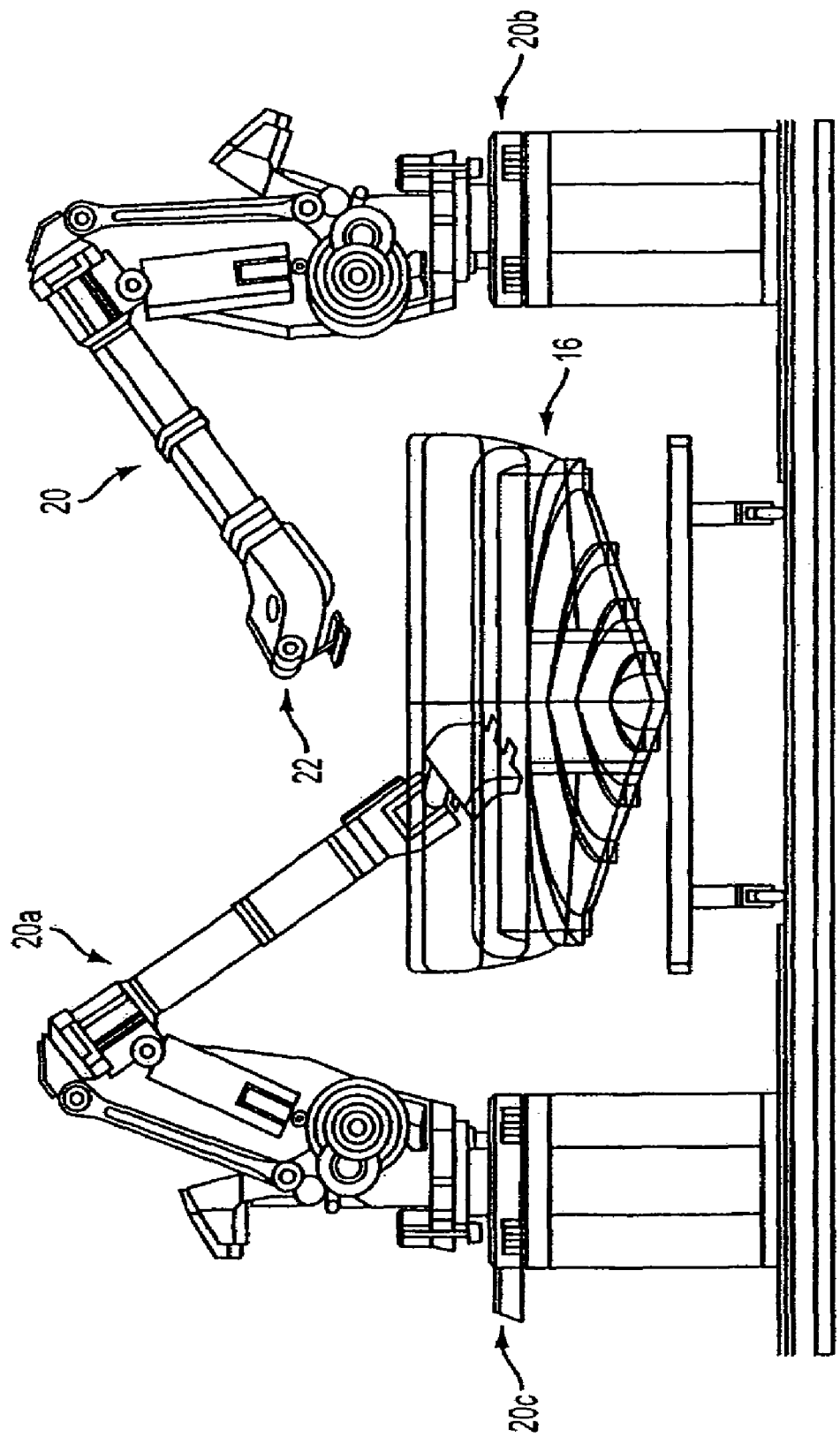

APPARATUS AND METHOD FOR MAKING PREFORMS IN MOLD

This Application is an U.S. Divisional Patent Application of U.S. patent application Ser. No. 10/947,543, filed Sep. 23, 2004, which claims priority from U.S. Provisional Patent Application No. 60/505,838, filed Sep. 26, 2003, and the complete disclosures of the aforesaid prior applications are incorporated herein by reference.

FIELD OF THE INVENTION

This invention relates to an apparatus and a method of making a preform, particularly for use in composite molded articles, and also composite molded articles. The apparatus and the method especially relate to making a structural preform for use with polymeric materials.

BACKGROUND OF THE INVENTION

High strength polymeric materials are being increasingly used to replace traditional structural materials, such as metal, in many applications. The polymeric materials have the advantage of lower weight and are often less expensive and more durable than metals. However, polymeric materials tend to be much lower in strength than metal. Unless polymeric materials are reinforced in some manner, they often do not meet the strength requirements for metal replacement.

Thus, polymeric composites have been developed to meet such strength requirements. These composites are characterized by having a continuous polymeric matrix within which is embedded a reinforcement material, which is usually a relatively rigid, high aspect ratio material such as glass fibers.

Such composites are typically molded into a predetermined shape, which is in many cases asymmetric. To place the reinforcement material into the composite, the reinforcement material is usually placed into the mold in a first step, followed by closing the mold and then introducing a fluid molding resin. The molding resin fills the mold, including the interstices between the fibers, and hardens (by cooling or curing) to form the desired composite. Alternatively, the molding resin can be applied to the reinforcing fiber prior to molding. The reinforcing fiber with resin thereon is then placed into a mold where temperature and pressure are applied, curing the resin to prepare the desired composite.

It is desirable to uniformly distribute the reinforcement material throughout the composite. Otherwise, the composite will have weak spots where the reinforcement is lacking. Thus, it is important to prepare the reinforcement material so that the individual fibers are distributed evenly throughout the composite. In addition, the individual fibers should be held in place to resist flowing with the molding resin as it enters the mold, which would disrupt the fiber distribution.

For these reasons, reinforcement has been conventionally formed into a mat outside of the mold. The preform mat is then placed in the mold and either impregnated with resin to make the final composite article, or simply heated and pressed to make a very low density composite article. The mat is generally prepared by forming the reinforcing fibers into a shape matching the inside of the mold and applying a binder to the fibers. In some instances, a thermosetting binder is pre-applied, and then cured after the fibers are shaped into a mat.

In other methods, a thermoplastic binder is applied, so that in a subsequent operation the binder can be heated and softened and the mat subsequently shaped. This binder "glues" the individual fibers to each other so that the resulting mat retains its shape when it is transferred to the mold for further processing. The binder also helps the individual fibers retain their positions when the fluid molding resin is introduced into the mold. In some cases, a molding resin can alternatively be applied to the reinforcing fiber prior to molding. The fiber with binder and resin is placed into a mold where temperature and pressure are then applied, curing the resin to prepare the desired composite.

Binders conventionally used have been primarily of three types, each of which have various drawbacks. The predominantly used binders have been solvent-borne polymers, i.e., liquids, such as epoxy and polyester resins. The solvent-borne binders are usually sprayed onto the mat via an "air-directed" method, and then the mat is heated to volatilize the solvent and, if necessary, cure the binder. This means that the application of binder is at least a two-step process, which is not desirable from an economic standpoint. Also, the use of solvents is encountered, which raises environmental, exposure and recovery issues. Dealing with these issues potentially adds significantly to the expense of the process. The procedure is also energy intensive, as the entire mat must be heated just to flash off solvent and cure the binder. The curing step also makes the process take longer.

Use of the solvent-borne polymer binders is extremely messy. There are also high maintenance costs associated with keeping the work area and the screen on which the mat is formed clean. In this case, where the binder may be low viscosity fluid, it tends to flow over and coat a large portion of the surface of the fibers. When a composite article is then prepared from a preform made in this way, the binder often interferes with the adhesion between the fibers and the continuous polymer phase, to the detriment of the physical properties of the final composite.

A second form of binder is powdered binders. These can be mixed with the fibers, and then the mass formed into a preform shape, which is heated to cure the binder in situ. Alternatively, these binders can be sprayed to contact the fibers. However, simply substituting a powdered binder in an air-directed method raises problems. For example, powdered binders cannot be applied unless a veil is first applied to the screen to prevent the binder particles from being sucked through. Again, this adds to the overall cost and adds a step to the process. Airborne powders may also present a health and explosion hazard, depending on conditions of use. The use of powdered binders additionally requires a heating step to melt the binder particles after they are applied to the fibers. Heating renders this process energy-intensive.

Binders of a third type are heated thermoplastic materials, which can be melted and sprayed as a binder. Use of these materials makes any subsequent heating step unnecessary, since the binder does not require heat to achieve some undetermined measure of adhesion to the fibers. This method has problems with "lofting," or inadequate compaction of the preform. Lofting typically occurs because the thermoplastics are conventionally heated to any random temperature above their melting points, leading to a lack of uniformity in their cooling patterns and extensive migration along fiber surfaces. This allows some of the fibers to "bounce back" before they are set into place by the solidifying thermoplastic. This may result in formation of a lower density preform than desired, density gradients throughout the preform, and poor adhesion of the fibers to each other.

In view of the problems discussed herein, one prior art method disclosed in U.S. Pat. No. 6,030,575, which is incorporated herein by reference, applies a heated binder to fibers already supported on a support surface while a vacuum is applied to the other side of the support surface. By this method, the fibers are held in place by the vacuum while the binder is applied at a high pressure by a spray device. This application applies pressure to the fibers thus forming a solid reinforcing structure. Upon application, and with the assistance of the air flow from the vacuum, the binder cools and solidifies into the desired preform shape. However, the application of the vacuum requires additional equipment in the form of a plenum arrangement and also requires additional control functions and labor to properly apply the fibers and vacuum. Therefore, the material and operating costs are increased.

In view of these prior art methods, it would be desirable to provide a simpler apparatus and a method for making preforms in which the problems associated with using solvent-borne, powdered or thermoplastic binders are minimized or overcome. It would also be desirable to provide apparatus and a method in which sagging, slumping, and separating of perform materials from tall vertical or nearly vertical surfaces is avoided. It would also be desirable to provide a lower cost method that is simple to operate and thus more conducive to automation. In a more simple forming process, it may even be possible to eliminate the need to transfer the preform to a molding tool and/or eliminate the need to apply a vacuum to the forming surface.

SUMMARY OF THE INVENTION

An aspect of this invention provides an apparatus and a method in which a high strength structural preform and composite molded article can be made efficiently and at a lower cost.

Another aspect of this invention provides an apparatus and a method of making a preform and/or a composite molded article that does not require the use of an additional amount of organic solvents.

A further aspect of this invention provides an apparatus and a method of making a preform and/or a composite molded article that can assume a variety of shapes, including asymmetric parts or portions of parts.

An additional aspect of this invention provides an apparatus and a method that uses less components and thus reduces the capital entry and operational production costs.

This invention can be easily adapted to automated production and/or control.

A method in accordance with this invention comprises the steps of providing reinforcing material, providing binder material, mixing the reinforcing material and the binder material so that the binder material adheres to the reinforcing material, applying a stream of the mixture to a support surface thereby adhering the mixture to the support surface, and solidifying the mixture to form the preform.

In particular, the method relates to making a preform for use in forming a structural part in which a stream of fibrous reinforcing material is provided, particulate or liquid or atomized binder material is adhered to the reinforcing material by providing a stream of binder material into the stream of fibrous reinforcing material in a venturi to form an adhesive mixture, and the adhesive mixture of the reinforcing material and the binder material is thermal sprayed against a support surface, optionally sequentially cooled by applying cooling media to the just thermally sprayed and deposited adhesive mixture, such that the mixture adheres to the support surface and solidifies into the preform.

Preforms and composite molded articles made in accordance with the method and its variations described herein are also encompassed by this invention.

It is to be understood that the invention described herein can be varied in a number of ways and is not restricted to the particular embodiments described herein. The invention is intended to generally include any embodiment in which the fiber and binder material is combined prior to application to the surface where it then solidifies in the desired shape.

BRIEF DESCRIPTION OF THE DRAWINGS

The invention will be described in greater detail in conjunction with the following drawings wherein:

FIG. 15 illustrates the use of more than one end effector in the fabrication of a preform.

DETAILED DESCRIPTION OF PREFERRED EMBODIMENTS

This invention is described below with reference to formation of a preform for use in the marine industry to construct fiberglass reinforced articles, such as a motor box for a boat, a hatch, deck, deck section or a boat hull. However, it is to be understood that this is an exemplary embodiment only and that the method can be applied in various applications in which high strength structural members are used. For example, a preform made in accordance with the disclosed embodiments of the invention could be used in the automotive, aircraft, or building industries or as a component of household goods, such as appliances. Further, although specific examples of materials are provided herein, any suitable material can be used.

Figure 1:
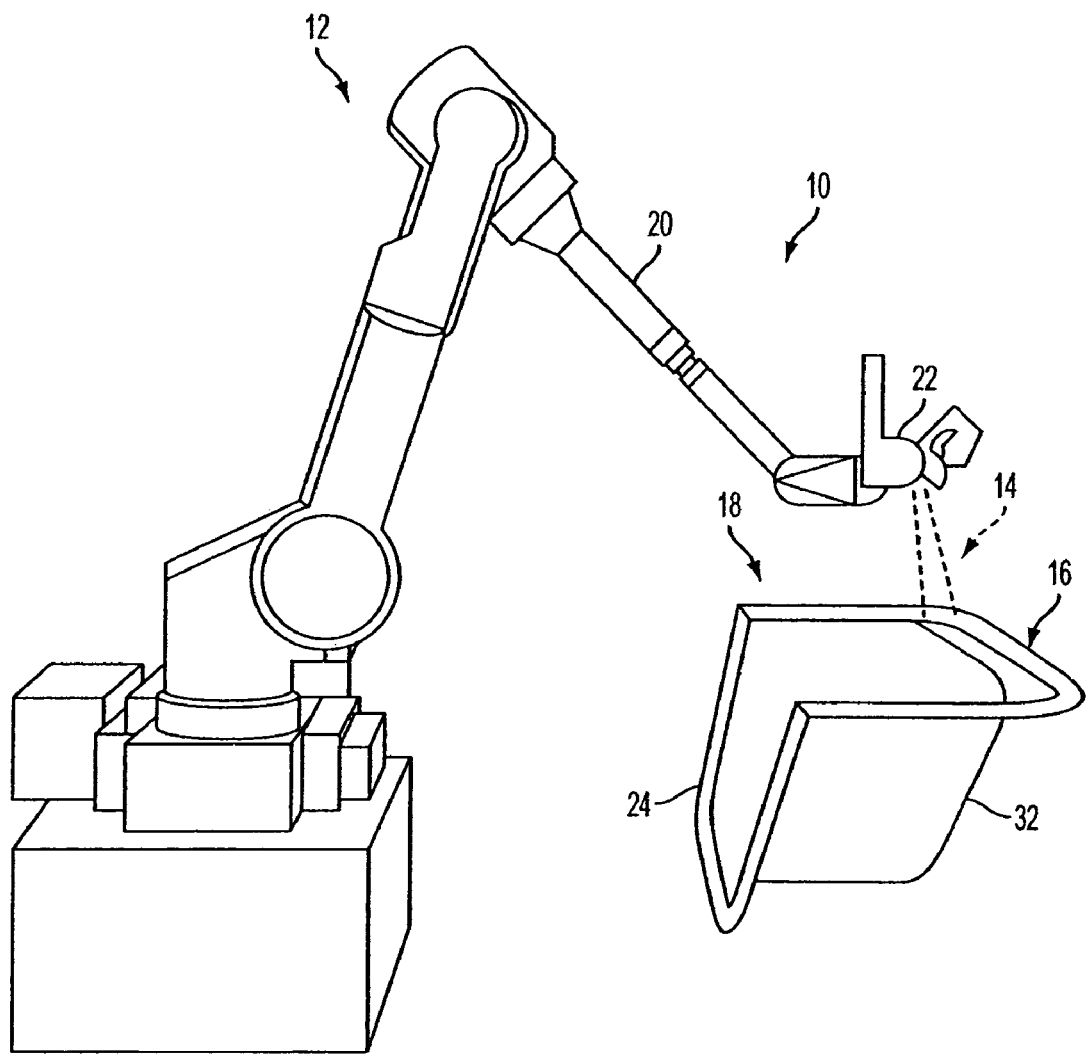
FIG. 1 is a schematic perspective view of an end effector depositing the material onto a surface to make a preform in accordance with an aspect of this invention.

As seen in FIG. 1, a preform making assembly 10 used to practice a method in accordance with the invention includes a materials applicator 12 that applies the preform material mixture 14 to a support surface 16 to create preform 18. The term preform in this application is intended to cover any structure used as a reinforcing insert or structural support within a composite structural part, which is preferably, but not necessarily, a molded part. Such a preform 18 can be used while remaining in a mold. Preform 18 could be formed and either used while remaining in its mold or placed within a closed mold or on an open mold (a tray or base, for example) to form the composite part. Alternatively, preform 18 could be used as a base structure having materials attached or molded to it, thus acting as a skeleton or tray and eliminating the need for a mold base or molding tool. Preform 18 can be any desired shape. In its simplest form, it resembles a shaped mat.

Materials applicator 12 in FIG. 1, includes a robotically controlled arm 20 with an end effector 22 that delivers the preform materials mixture 14 to support surface 16. Preform materials mixture 14 can be applied by end effector 22 by any known application method, including for example, spraying, blowing, streaming, ejecting, laminating, or draping.

Figure 2:
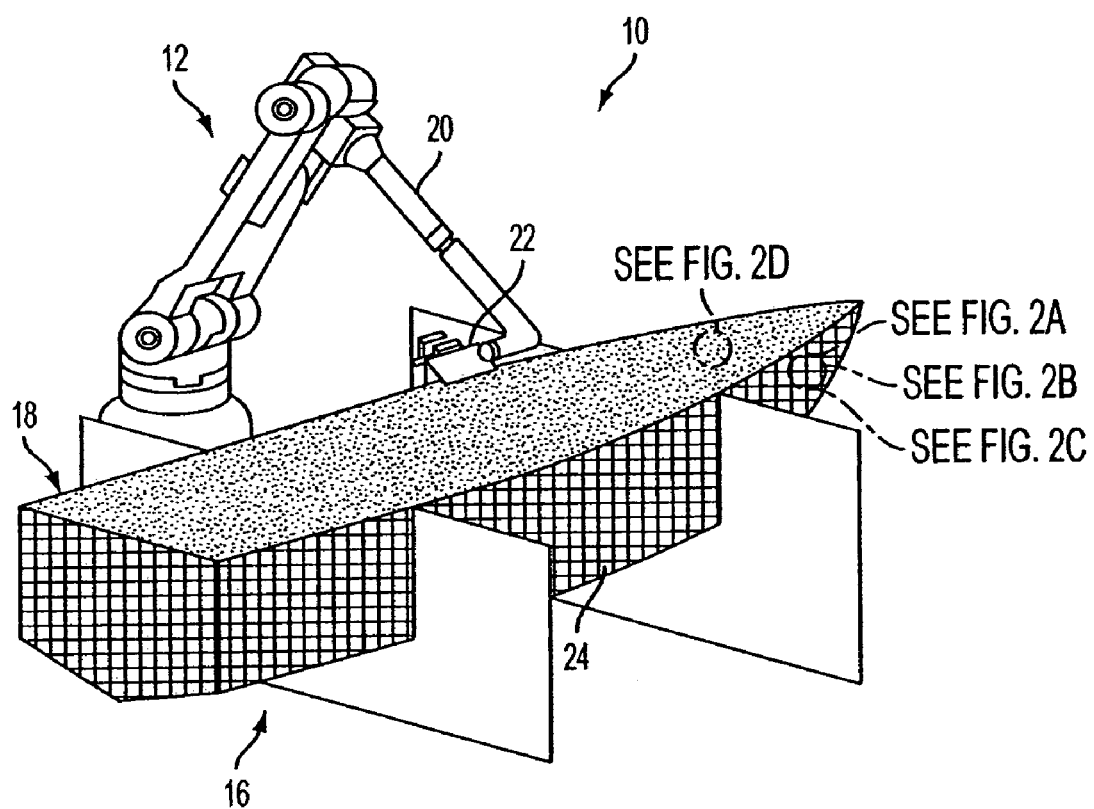
FIG. 2 is a schematic perspective view of a preform being made in accordance with an aspect of this invention.

As seen in FIG. 1, support surface 16 can be any surface including an entire part shape or portions of a part. Support surface 16 can include surfaces oriented in any plane. This method is particularly suited for applying material to a vertical surface 24. FIG. 2, for example, shows a preform 18 shaped as an entire boat hull, which can serve as a free standing structural base during molding. In this case, preform materials mixture 14 applied to support surface 16 includes randomly oriented chopped glass fibers retained by a thermoplastic binder, as seen in FIG. 2D.

As will be recognized, support surface 16 can be made of any suitable material, including fiberglass, metal or ceramic, especially materials known for use in molding tools. The surface can also be pretreated if desired. For example, if preform 18 will be used merely by compressing and heating the preform without additional molding steps, it may be desirable to powder coat support surface 16. Also, surface treatments used for molding can be employed, such as a gel coat, mold release agent, peel shell or veil, used alone or in various combinations. Obviously, the intended use of preform 18 can dictate the precise configuration of support surface 16.

Figure 2A:
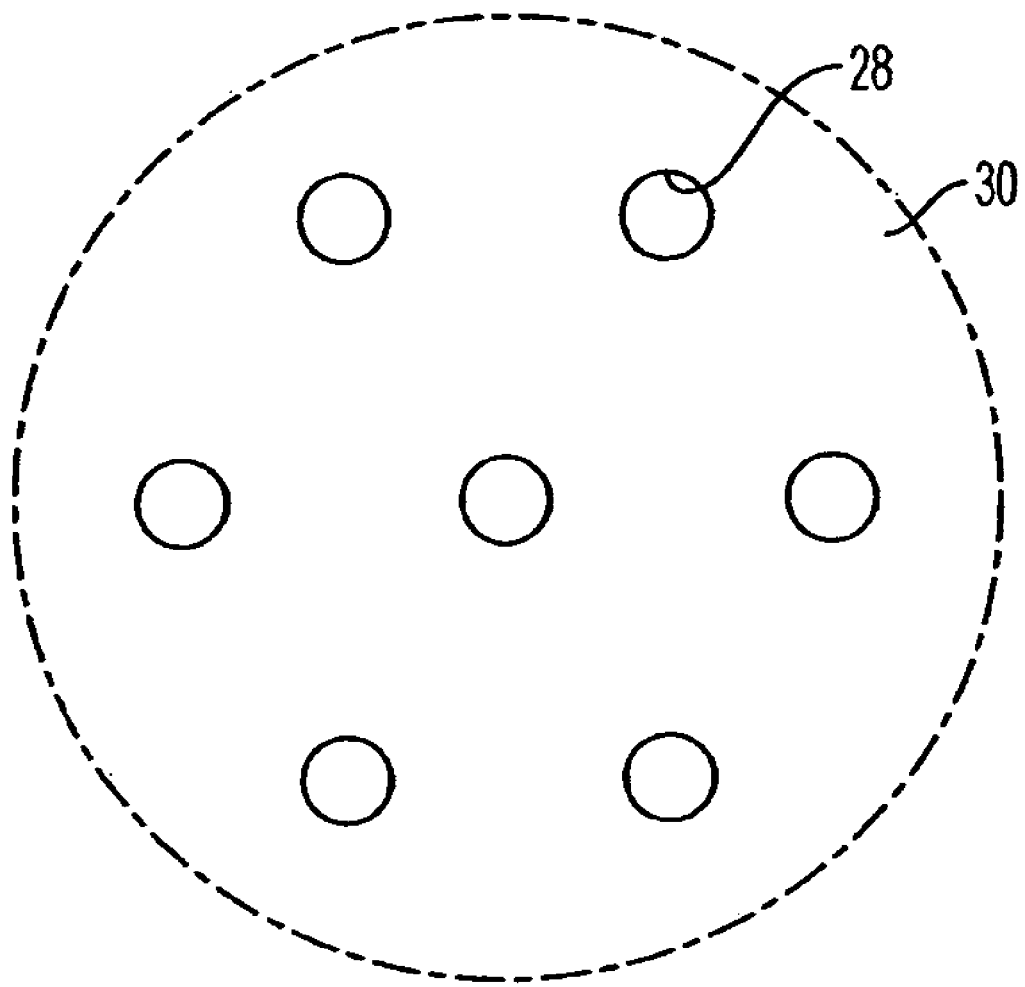
FIG. 2A is an enlarged partial section of one type of forming surface for use with the method in accordance with the invention.
Figure 2B:
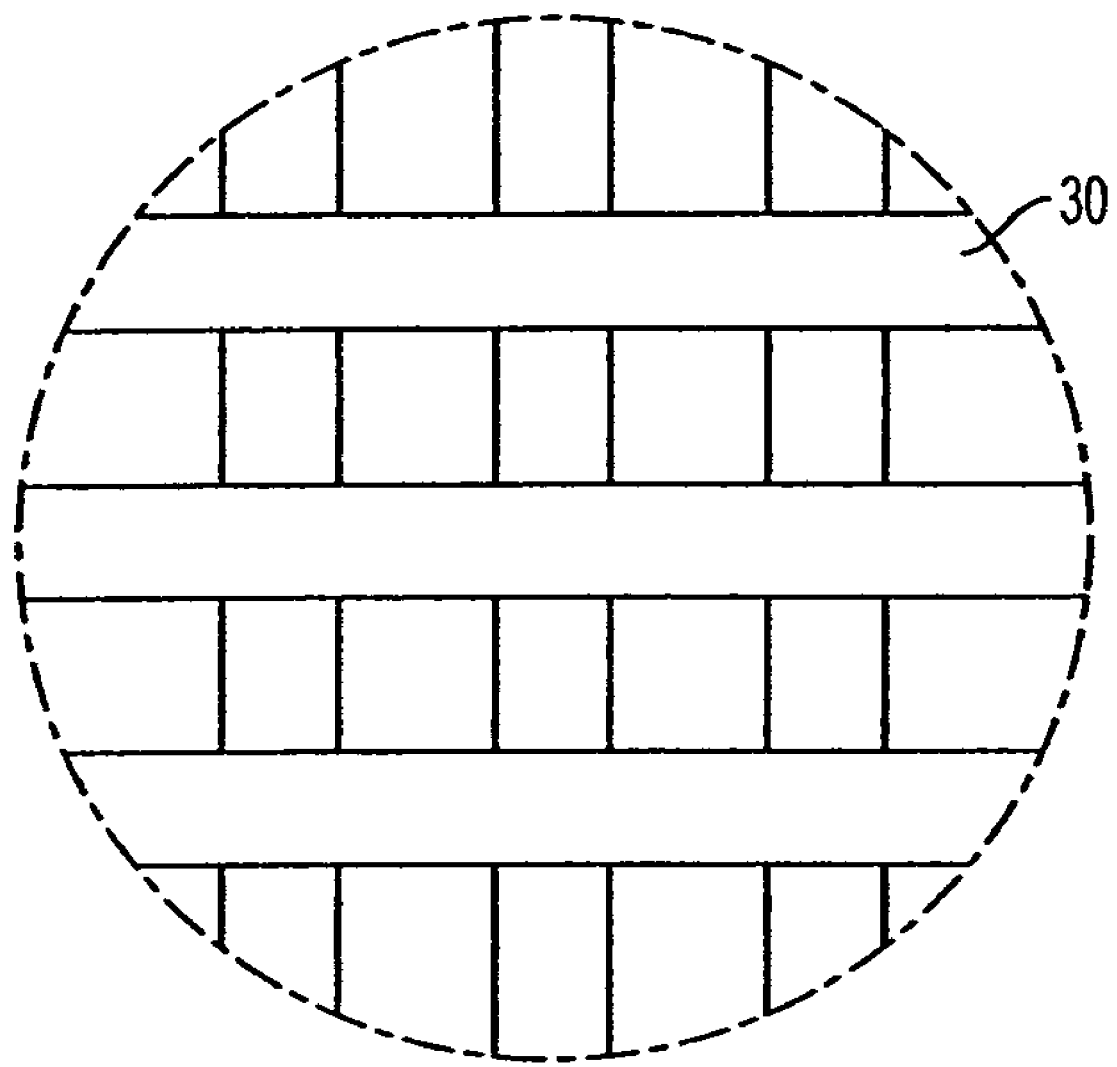
FIG. 2B is an enlarged partial section of another type of forming surface for use with the method in accordance with the invention.
Figure 2C:
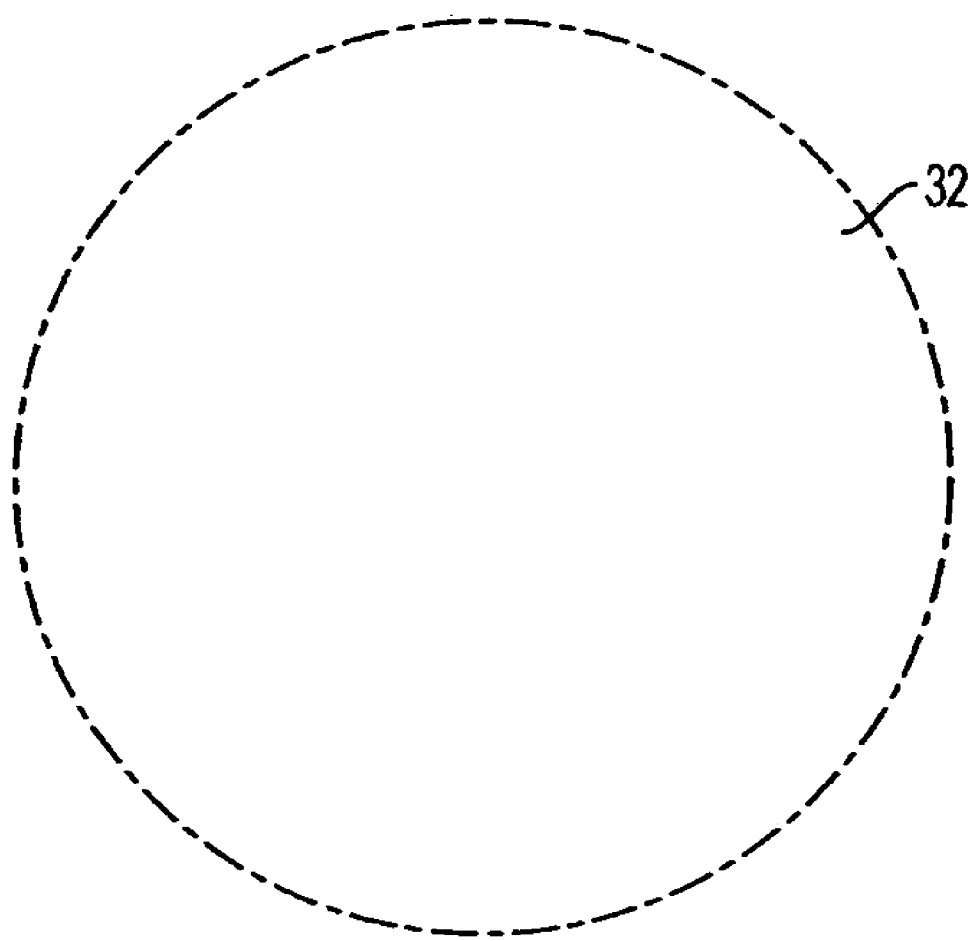
FIG. 2C is an enlarged partial section of another type of forming surface for use with the method in accordance with the invention.
Figure 2D:
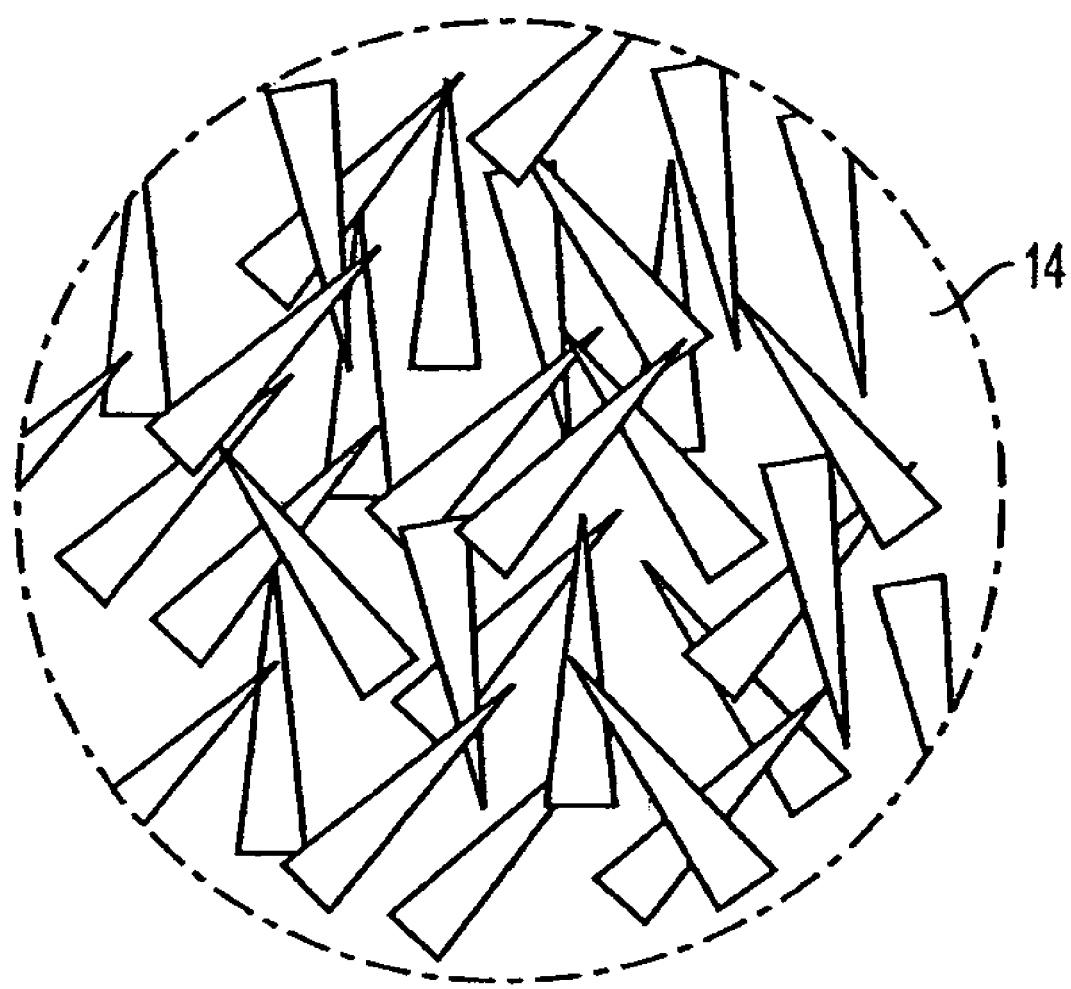
FIG. 2D is an enlarged partial section of a preform formed by a method in accordance with the invention.

FIGS. 2A-2C show variations of support surface 16 usable with the method in accordance with embodiments of the invention. Support surface 16 can be a perforated plate-like member 26 with apertures 28, as seen in FIG. 2A, which allows air to flow through apertures 28 in member 26 during application. Although, as described below, there is no controlled air flow at support surface 16, ambient air trapped between support surface 16 and mixture 14 during application can escape through apertures 28, thus providing more control during application of mixture 14 and a more compact preform 18.

Alternatively, support surface 16 can be a stiff mesh 30 as seen in FIG. 2B. In this embodiment, mixture 14 can adhere to mesh 30 and integrate mesh 30 into the preform structure, thus adding rigidity. Mesh 30 also has the additional advantage of allowing ambient air to flow through its apertures during application of mixture 14. Mesh 30 can be any suitable material, including fiberglass, plastic, metal, wood or any combination thereof. Mesh 30 offers advantages during subsequent molding by providing interstices into which later applied resin can flow and bind.

FIG. 2C shows a third type of support surface 16 suitable for this method. In this case, support surface 16 is a solid plate 32. A solid plate surface 32 is also shown in FIG. 1 in which a preform for a part is being formed. Mixture 14 directly adheres to plate 32 during application. This variation can result in a compact preform structure 18 as mixture 14 is pressed onto plate 32. Also, in this case, solidified mixture 14 can have a smooth outer surface for later treatment.

Support surface 16 also does not need to be shaped into the final desired shape of preform 18. Because mixture 14 is applied while tacky or viscous, by controlling the applied viscosity, mixture 14 can be pressed into a different desired shape than support surface 16 before solidification. This allows a large degree of flexibility in preform shapes as preform 18 is not restricted to the shape of support surface 16.

Any suitable materials can be used to create preform 18. The reinforcing material can be any material suitable as use as reinforcement. Preferably, the reinforcing material is a relatively rigid, high aspect ratio material. In a preferred embodiment, the material is a chopped fibrous material such as fiberglass, aramid fiber (Kevlar brand fiber), high molecular weight polyolefin such as ultra high molecular weight polyethylene (UHMWPE), carbon fiber, acrylonitrile fiber, polyester fiber or a combination of any thereof. The material can be provided as a chop, or it can be chopped during or just prior to the application process. It is preferable that the reinforcement provides a surface with interstices so that subsequently applied molding material can closely bind with the reinforcement.

In the various described embodiments, fibrous reinforcement cut or chopped sufficiently for deposition via an effector 22 may be preferred. It should, however, be understood that a continuous fiber deposition can also or additionally be accomplished in accordance with the present invention. By appropriate programming of a robotic arm 20, a suitable end effector 22 can deposit a continuous fiber on a surface 16 in a pattern (swirls, loops or other pattern) or orient continuous fiber during deposition in order to provide certain properties to a preform and to a composite molded article made from such a preform. For instance, a continuous fiber pattern can be laid from bow to stern when making a preform for a boat hull, and/or can be laid transverse across the beam (port to starboard). The fiber thus laid can be continuous in the pattern or a chopper can be programmed to cut fiber discretely as an end effector 22 reaches a designated point as it traverses across a surface 16. It will also be appreciated that in principle a chopper, such as a chopper device 44 or a chopper gun in FIGS. 8a-d, can be programmable and thus controlled to permit an end effector 22 to switch from depositing a mixture of chopped fiber/binder to depositing continuous fiber (fiber or fiber plus binder) and so on as a preform is fabricated in a mold.

The binder can be a commercially available particulate binder material, including thermoplastic and thermoset polymers, cellular and non-cellular polymers, glasses, ceramics, metals, or multi component reactive systems. One type of suitable binder, for example, is a thermoplastic epoxy hybrid. Preferably, the binder is a true solid or supercooled liquid at the ambient temperature prevailing during use so that volatile organics such as solvents are not present in significant amounts. By this, environmental problems associated with solvents can be avoided. Further, the binder is preferably a material that does not need post heat treatment for curing, thus reducing time and energy requirements. The particular material can be any known binder, preferably one that can be conditioned, and/or melted without significant decomposition, adhered to reinforcing material upon cooling, and durable at temperature ranges typical in molding. A binder can be formulated to include a rubbery component or be rubbery binder to provide toughness to the preform and composite molded article therefrom. A rubbery component can also be added separately from the binder and/or separately from fiber. Suitably rubbery components include, for instance, nitrile, urethane or a thermoplastic, preferably as suitably sized particulates. Although a single polymeric binder can be used, a blend is preferred when the deposited material needs to adhere well on a tall vertical or tall nearly vertical surface because adhesion is improved, especially when a curtain of a cooling media is passed over deposited material (fibers and binder blend). In the various described embodiments, the binder can advantageously be a mixture or combination of binders. A commercially available polyester type binders, such as Stypol® brand polyesters such as grade 044-8015 (Cook Composites and Polymers), becomes tacky after heat is applied in a heating zone from burners and can exhibit good initial adherence to a surface. A hybrid binder, such as a blend of epoxy and polyester binder ingredients, can become tacky quickly and, when subjected to a cooling media after being deposited on a surface, surprisingly can exhibit a comparatively quicker set, stiffness and rigidity to maintain the fiber in place when a fiber/binder mixture is applied as deposited material on a vertical or nearly vertical surface. An exemplary binder blend may incorporate an epoxy based thermoplastic granular powder (50-100 mesh, <35% fines) having relatively high molecular weight, softening point approximately 75-80 C, with suitable polyester or also in combination a lower molecular weight pulverulent epoxy (50-100 mesh, <35% fines) having a higher softening point approximately 90 to 95 C, with the latter being more soluble in a solvent than the former epoxy. Suitable epoxies are available from Dow Chemical. In principle, suitable combinations of binder constituents can be chosen based on reactivities, Tg, and the like known in the powder coating industry. In one of the preferred embodiments, about 10 wt. % binder relative to glass fibers (cut, chopped etc.) is used. In a further aspect of one of the preferred embodiments, the 10 wt. % binder comprises, as a hybrid binder, a blend of about 3:1 polyester: epoxy. The ratio can be adjusted to suit specific application requirements. The particular binder can be selected based on the desired characteristics of the preform and its ultimate intended use. The density of the perform can be controlled by the length of fiber chop or combination of fiber lengths applied, the amount of binder and the layer or layer(s) of fiber/binder applied, and/or by whether or not the perform is subsequently compressed.

It will be appreciated that a variation of the described embodiments in which an end effector 22 deposits what may be termed a "pre-preg" on a surface 16, which may be a mold surface in mold tooling, is also part of the invention. In this embodiment, the amount of fiber reinforcement and resin deposited via an end effector 22 can include higher quantity of binder(s). For instance, in a pre-preg type embodiment, the binder(s) can be in an amount ranging up to approximately 20 to 30 or even up to 40% of the deposited material on a surface 16. The fiber reinforcement can constitute approximately the remainder, but is preferably deposited in higher lofted condition upon deposition for certain end uses. Higher lofting can be achieved by using longer cut or chopped fiber lengths, or a higher percentage of longer lengthed fiber reinforcement.

In principle, in these and the other embodiments, other materials can be introduced into an end effector 22 to be applied to a support surface 16. For example, a preform having potential electrical conductivity can be prepared by incorporating a powdered metal, carbon powder, or even an electrically conductive polymer in the reinforcement stream, the binder stream or by a separate stream. Flame retardant materials, for example, can be applied when forming a preform. The additional optional materials can be incorporated in the mixture as applied to the surface 16. Of course, if desired the other materials can be applied separately to a surface 16 (such as a prepared surface of a mold tool) apart from a fiber/binder mixture supplied end effector 22.

Figure 3:
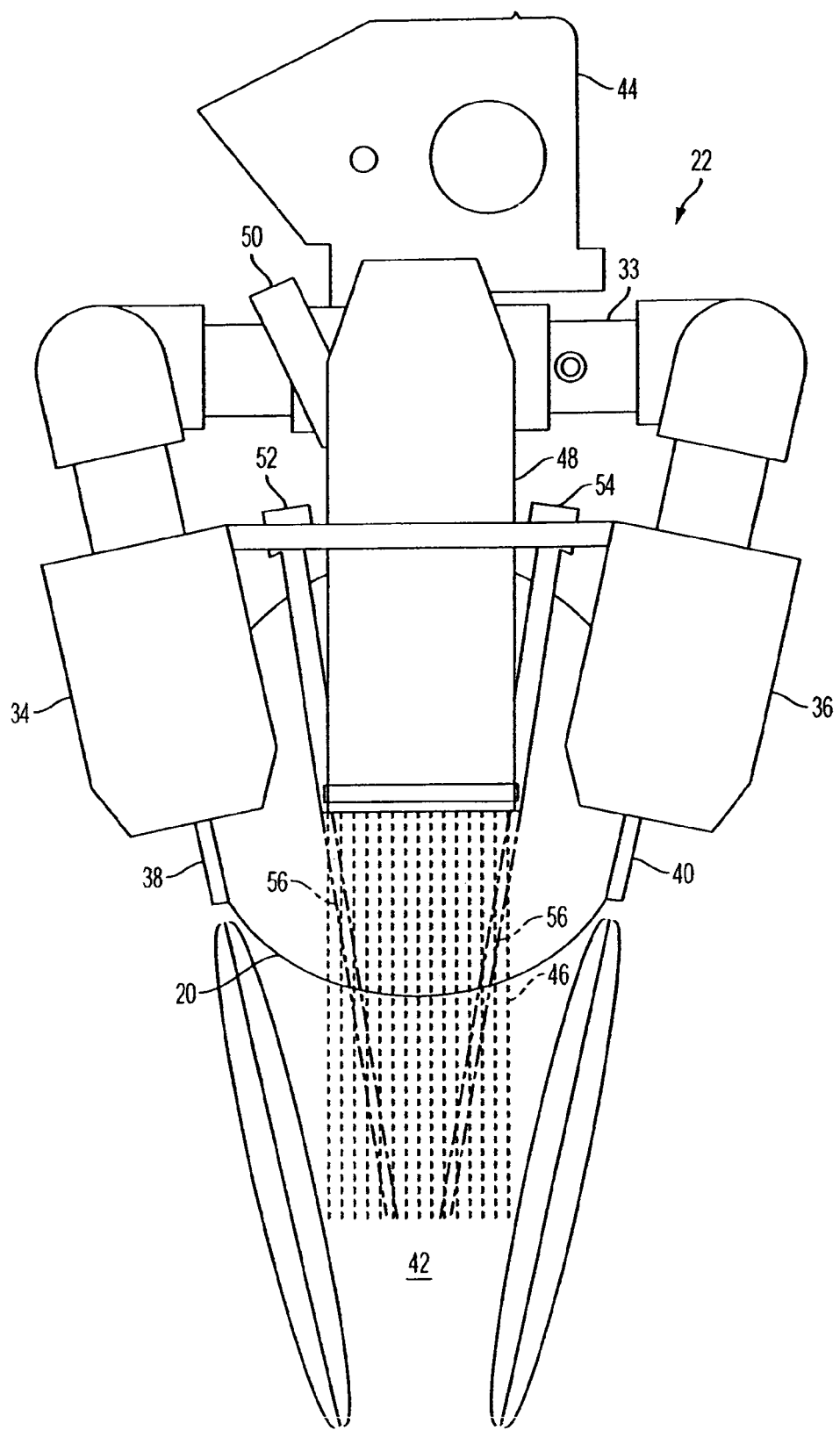
FIG. 3 is a partial side view of an end effector for use with an embodiment of the method in accordance with the invention.
Figure 4:
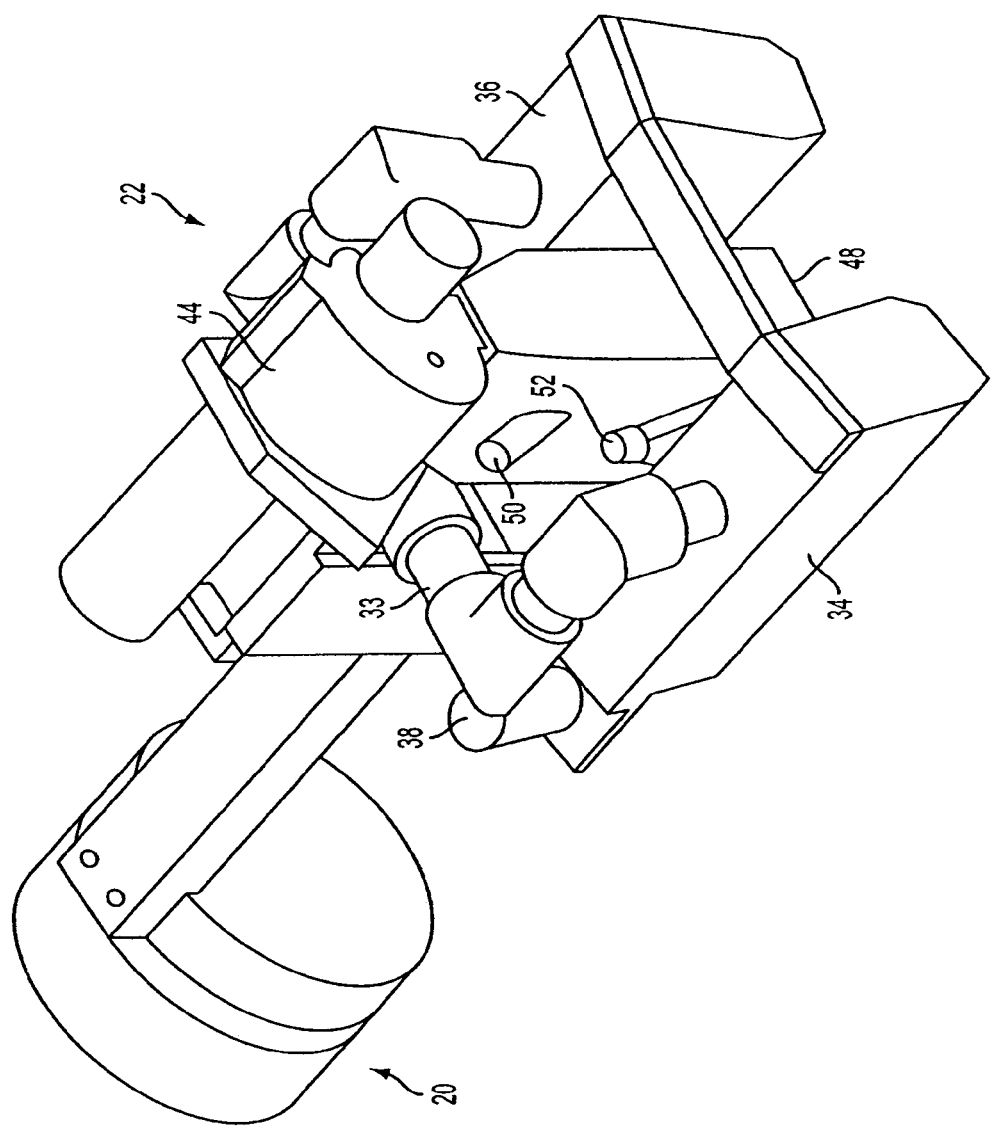
FIG. 4 is a partial perspective view of an end effector of FIG. 3.

An exemplary type of suitable end effector 22 is shown in FIGS. 3 and 4. End effector 22 is any element that can deliver material in accordance with the method and its variations disclosed herein. End effector 22 is preferably carried by robotic arm 20, but obviously could be manually or otherwise supported. In this method, a dual heat element configuration is employed. As seen in FIG. 3, a balanced split supply header 33, preferably natural gas, feeds two burners 34 and 36. The balanced header 33 splits a main header to allow common feed to burners 34 and 36 to maintain uniformity and equity of gas mixture supply and inlet pressure conditions in-process. Although not shown, an end effector 22 preferably includes a manifold (sometimes referred to as curtain generating and directing device) capable of providing a curtain of cooling media, such as air or a non-ignitable gas, to material 14 deposited on a surface 16 as the end effector 22 passes across the surface 16.

Each burner 34 and 36 has a burner ignition element 38 and 40, respectively, which could be capable of program driven ignition or manual remote control. Other burners described herein can be similarly ignited and controlled. As will be described below, the dual burner configuration creates a heat envelope or zone 42 within the flames thrown by burners 34 and 36.

Preferably, burner(s) 34 (36), for example, provides a controlled, variable and even temperature profile with a nominal capacity of about 10,000 BTU per lineal inch of burner. Burner(s) 34 (36) can include a supplied gas mixture control cabinet with sensors that continually monitor and correct flame mixture quality and oxygen content. Thus, flame quality can be controlled within predetermined limits. Automatic shutdown can be provided when the specified parameters are exceeded or if unsafe mixture conditions occur. The use of natural gas is preferred for cost and efficiency, but any fuel could be used. A low pressure flame or, in principle, a hot air stream, can also be employed. For example, the flame velocity can be around 1000 feet per minute. Of course, any number of burners or other suitable heat source(s) could be used depending on the desired size and configuration of heating zone 42.

Reinforcing material is provided by material chopping device 44. Chopping device 44 can vary depending on the type of material being chopped. Chopping device 44 may be fully integrated with the process control system to allow in-process start, stop, and run parameter adjustment based on control program requirements or process sensors and control system signals from process monitoring. Chopping device 44 may also be manually controlled or varied by operator input. It is also possible to use pre-chopped material or other particulate material if desired. A chopping device, such as a chopping gun, in this or other embodiments herein can provide chopped fiberous reinforcement in more than one length, i.e. a quantity of chopped fibrous reinforcement of a certain length and another quantity of chopped fibrous reinforcement of longer or shorter length.

Chopped material 46 is fed through material shape tube 48. Chopped material 46, also called "chop", can be blown, dropped, ejected or otherwise expelled from tube 48. Tube 48 is designed to provide a discrete controlled area for material processing in preparation for introducing chopped material 46 into the material stream. It can also provide a controlled volume for any material conditioning medium that may be desired. As seen in FIG. 3, chopped material 46 is fed in a stream toward heating zone 42. An air inlet 50 is provided in tube 48 to assist in shaping or orienting the stream of chopped material 46 as it is expelled from tube 48.

Binder introduction ports 52 and 54 deposit binder 56, in the form of streams, toward heat zone 42. Ports 52 and 54 are preferably designed to introduce air conveyed binder from a metered dispensing unit into the material stream. Binder 56 can be in the form of particulate or any conventional form that can be mixed in with chopped fibers 46, as noted above. In this arrangement, binder 56 is presented as dual streams that are interspersed into the flow of chopped fibers 46 prior to entering heat zone 42.

Figure 5:
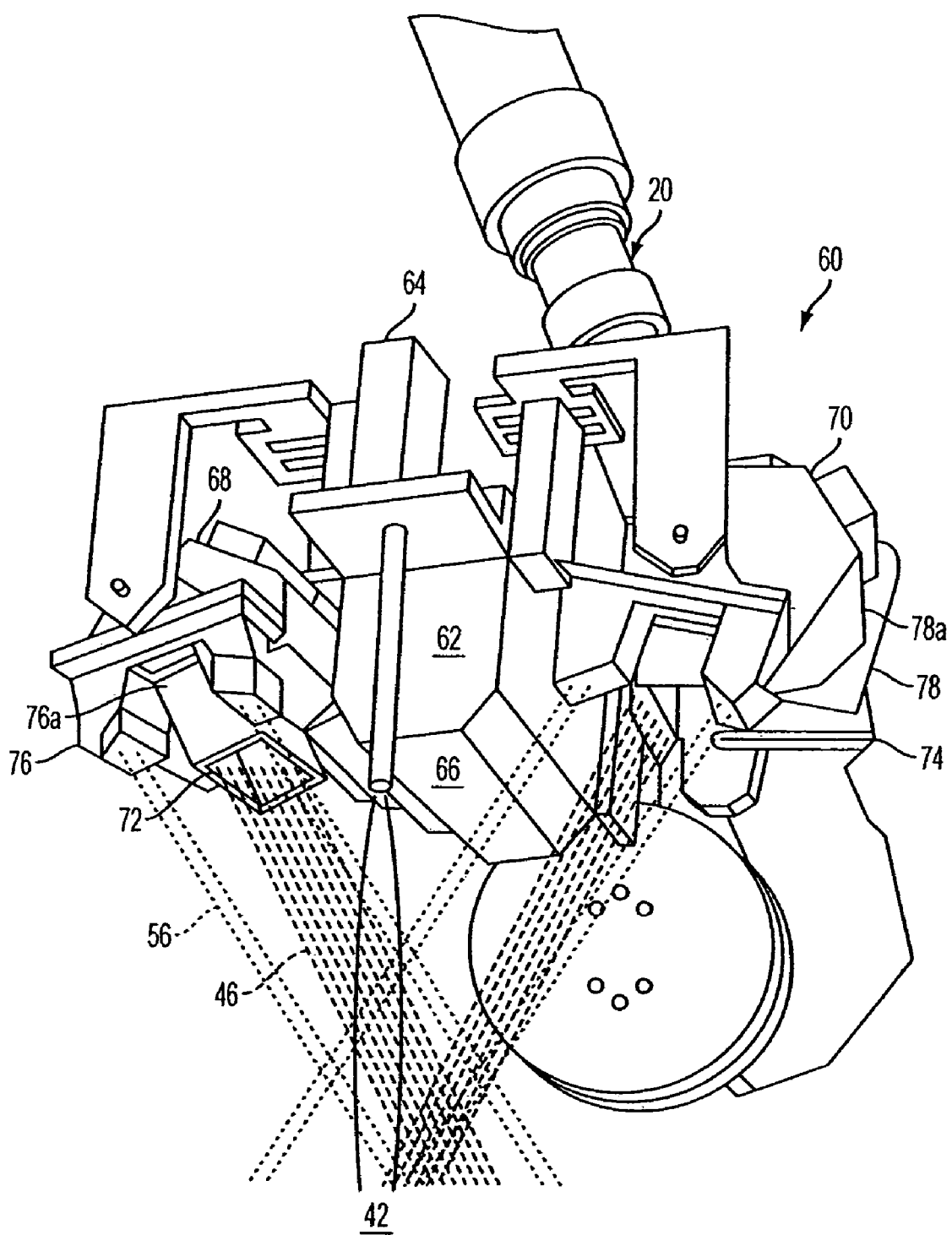
FIG. 5 is a partial side perspective view of an end effector for use with an embodiment of a method in accordance with the invention.

An alternate end effector assembly is shown in FIG. 5, in which an end effector 60 is mounted on robotic arm 20. In this arrangement, a central burner element 62 is provided with a single burner ignition element 64 and a burner face 66. A pair of reinforcement material chopping devices 68 and 70 are positioned on either side of burner element 62 and deliver streams of chopped fiber 46 toward a focal point in heat zone 42 though delivery tubes 72 and 74, respectively. Four binder introduction ports E (reference numbers 76, 76a, 78, and 78a) are provided adjacent to reinforcing material delivery tubes 72, 74 to deliver streams of binder toward the focal point). By this, streams of reinforcing material 46 and binder 56 can be layered together into the heating zone 42 to mix the materials and create an adhesive mixture. Although not shown, an end effector 22 preferably includes a manifold (sometimes referred to as curtain generating and directing device) capable of providing a curtain of cooling media, such as air or a non-ignitable gas, to material 14 deposited on a surface 16 as the end effector 22 is directed or passed across the surface 16.

Alternatively, binder 56 can be conditioned by a conditioning device, such as a heater, prior to being introduced into the stream of reinforcing material 46. In this case, no heat zone would be necessary, which would eliminate the gas control cabinet and controls, independent metered binder feed unit, burner supply header, and the ignition and burner elements. Such a binder heater could heat treat the material and then blow air across the surface to eject heated binder particles.

In operation, the particular end effector could vary provided that reinforcing material 46 is delivered to a zone in which heated binder 56 can be mixed therewith. The mixing causes the materials to adhere into an adhesive mixture 14. Adhesive mixture 14 is then deposited onto support surface 16 where it solidifies into preform 18. Use of different end effector arrangements allows different properties to be achieved. Using different numbers of streams or layers of reinforcing material 46 and binder 56 will vary the final preform properties. Similarly, mixing binder 56 after it is heated, before it is heated or while it is being heated will vary the final properties of preform 18.

Figure 6:
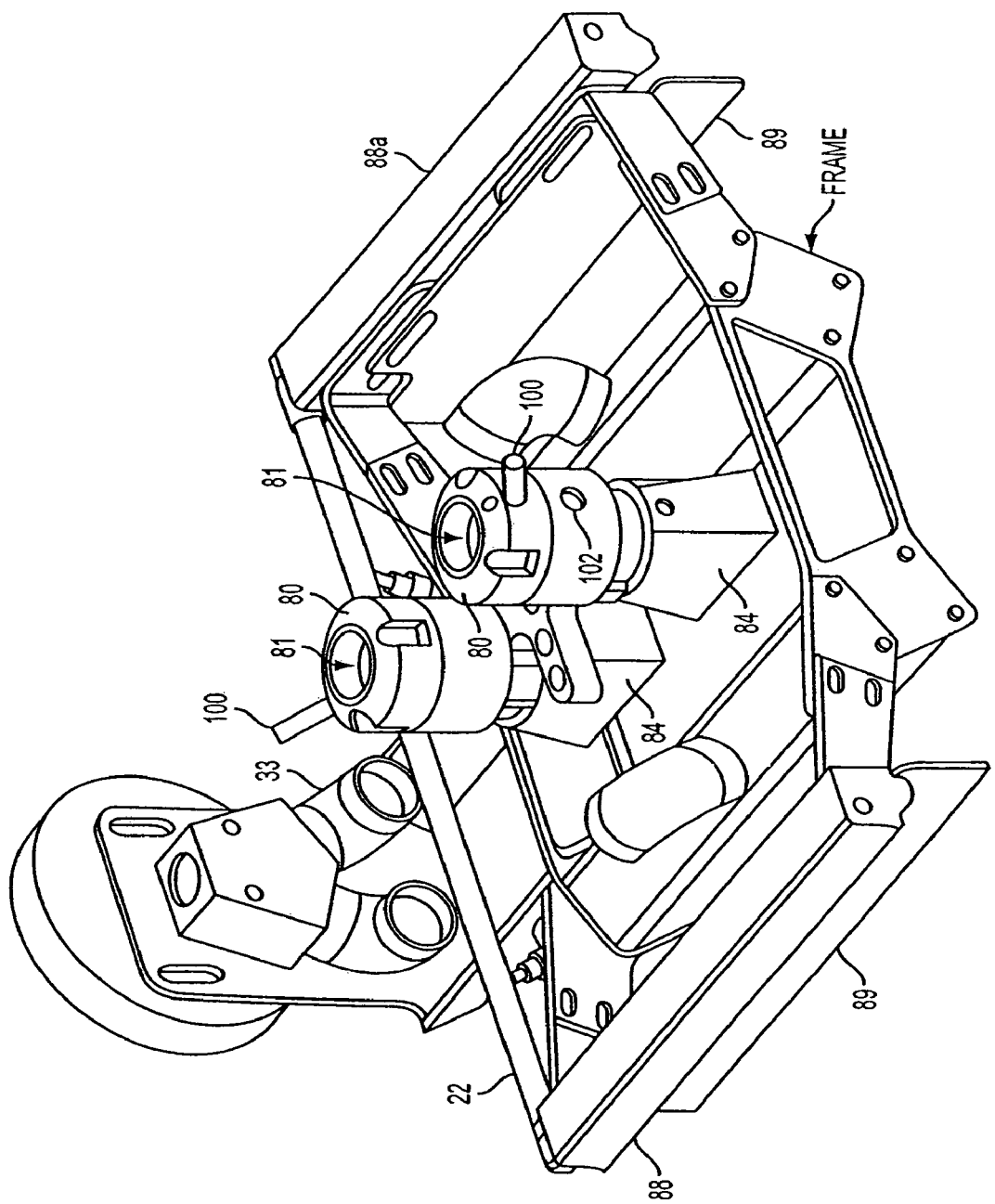
FIG. 6 is a partial perspective view of an end effector showing provided with elements for applying a curtain of cooling media.

As depicted in FIG. 6, another suitable end effector 22 includes venturi 80 that have a generally centrally located port 81 through which reinforcement, chopped fiber glass, carbon fiber or the like, is introduced. The binder is delivered into a venturi through port 100, can coat the reinforcement streaming through the venturi 80 and together with the reinforcement is expelled by a carrier gas from the venturi 80 through a nozzle 84 in a spray pattern.

Figure 7:
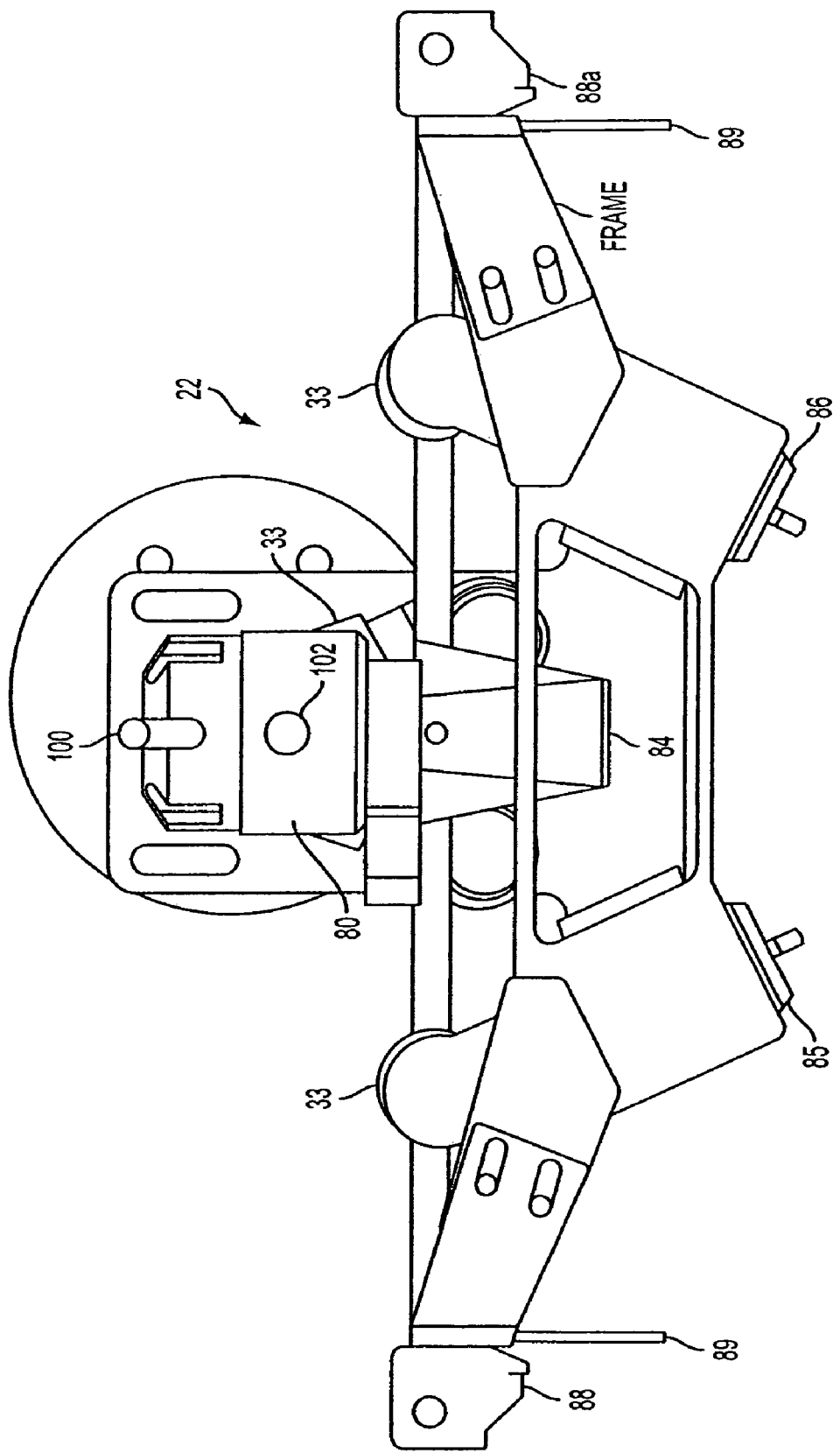
FIG. 7 is a partial end view of an end effector and the arrangement for providing a curtain of cooling media.
Figure 9:
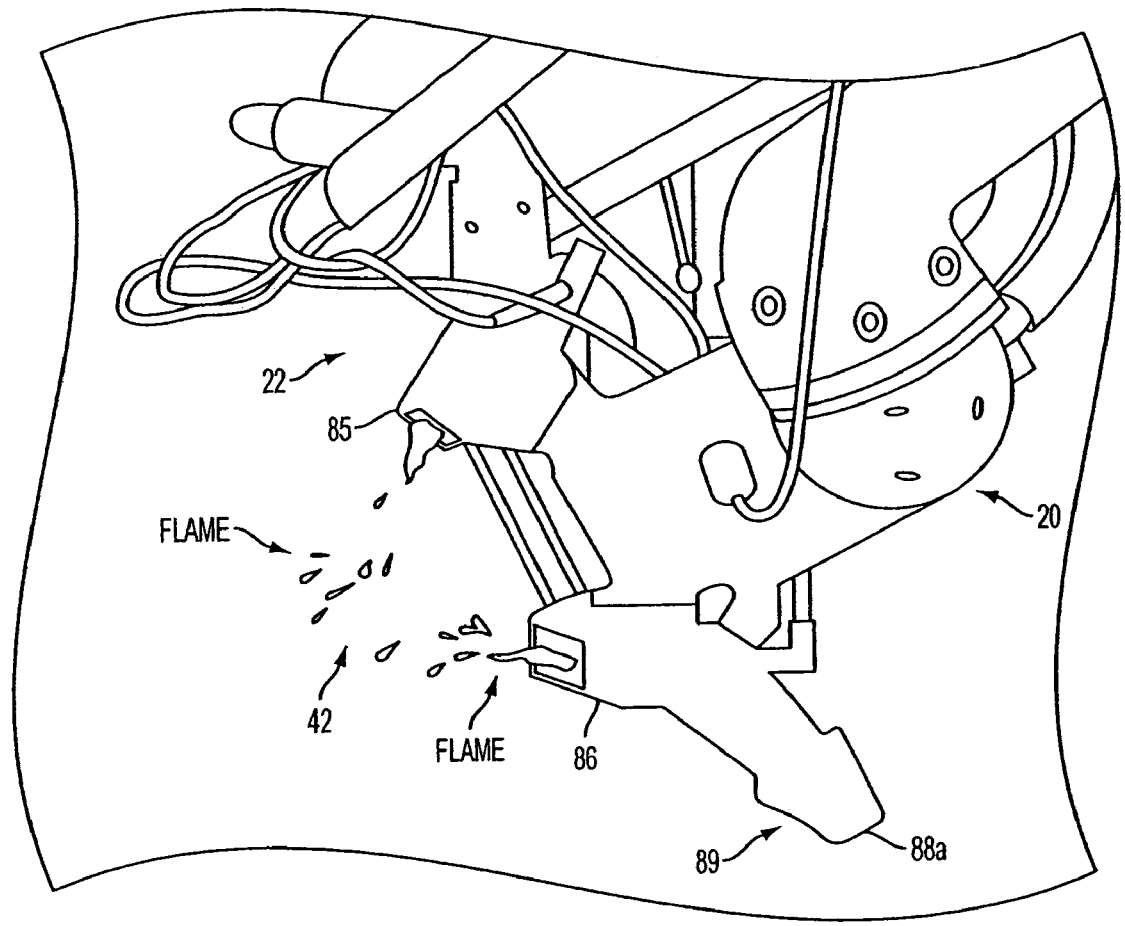
FIG. 9 depicts an end effector with heaters in operation to generate a heating zone and a mixture of reinforcing fibers plus binder streaming through the heating zone.

As shown in FIGS. 6 and 7, opposing burners 85 and 86 are preferably canted inwardly at a slight angle relative to one another. In operation, the flames from burners 85 and 86 are preferably not parallel to a stream of binder and reinforcement expelled nozzle 84 so that as the stream exits a nozzle, it will pass through a heating zone created by the flames from burners 85 and 86. This zone is similar to zone 42 (FIG. 3 and FIG. 4). This is also shown in FIG. 9.

As described above, an end effector 22 is preferably, operatively positioned at a distance from a surface 16 (not shown) in order to achieve a consistent deposit of binder/reinforcement ("deposited material) on the surface.

With a surface 16 that includes a relatively vertical portion, vertical portion, or portion having complex curvature or arc, such as a side of a boat hull or vehicle body part, material 14 (from the stream of binder coated fiber) initially sticks to such surface. The deposited material 14 can, however, sag, slump or slough off such vertical portions (sometimes called sections or regions), such as sections of boat hulls or vehicle parts. A cooling curtain can overcome the above problem. A gaseous cooling media, such as an air curtain, from balanced manifolds 88 and 88a (FIGS. 6, 7, 8 and 9), is applied to the fiber/binder mixture deposited as an end effector 22 traverses over a surface 16 or over a previously deposited layer on a surface. The cooling provided is such that the binder may be induced to more quickly set, or at least more completely partially cure, so the deposited material can retain internal rigidity, shape and position on a vertical portion, nearly vertical portion, or a highly complex curved portion of a surface 16. Steeply sloped portions of a surface 16 also advantageously receive deposited material with subsequent cooling from a cooling curtain as described above. As shown in FIGS. 6 and 7, manifolds 88 and 88a can include a guide element 89 to help direct the cooling media to the surface 16 while minimizing potential interference with the heating zone established by the flames from burners 85 and 86. The guide element 89 also helps avoid accumulation of fibers and stray binder from accumulating on and potentially clogging the manifolds 88 and 88a. The manifolds, e.g., cooling curtain generating and delivering devices, provide a gaseous cooling media that can, if desired, be pre-cooled or conditioned. The gaseous cooling media can be air or an inert, non-ignitable gas such as nitrogen. An air curtain can also advantageously entrain surrounding atmosphere as it flows towards a surface 16 to thereby increase the overall volume of cooling media applied. The cooling media supplied via manifolds 88 and 88a is preferably subject to process controls that regulate, for instance, the rate, amount, pressure, duration, and interruption in the supply or application of the cooling media.

Figure 7A:
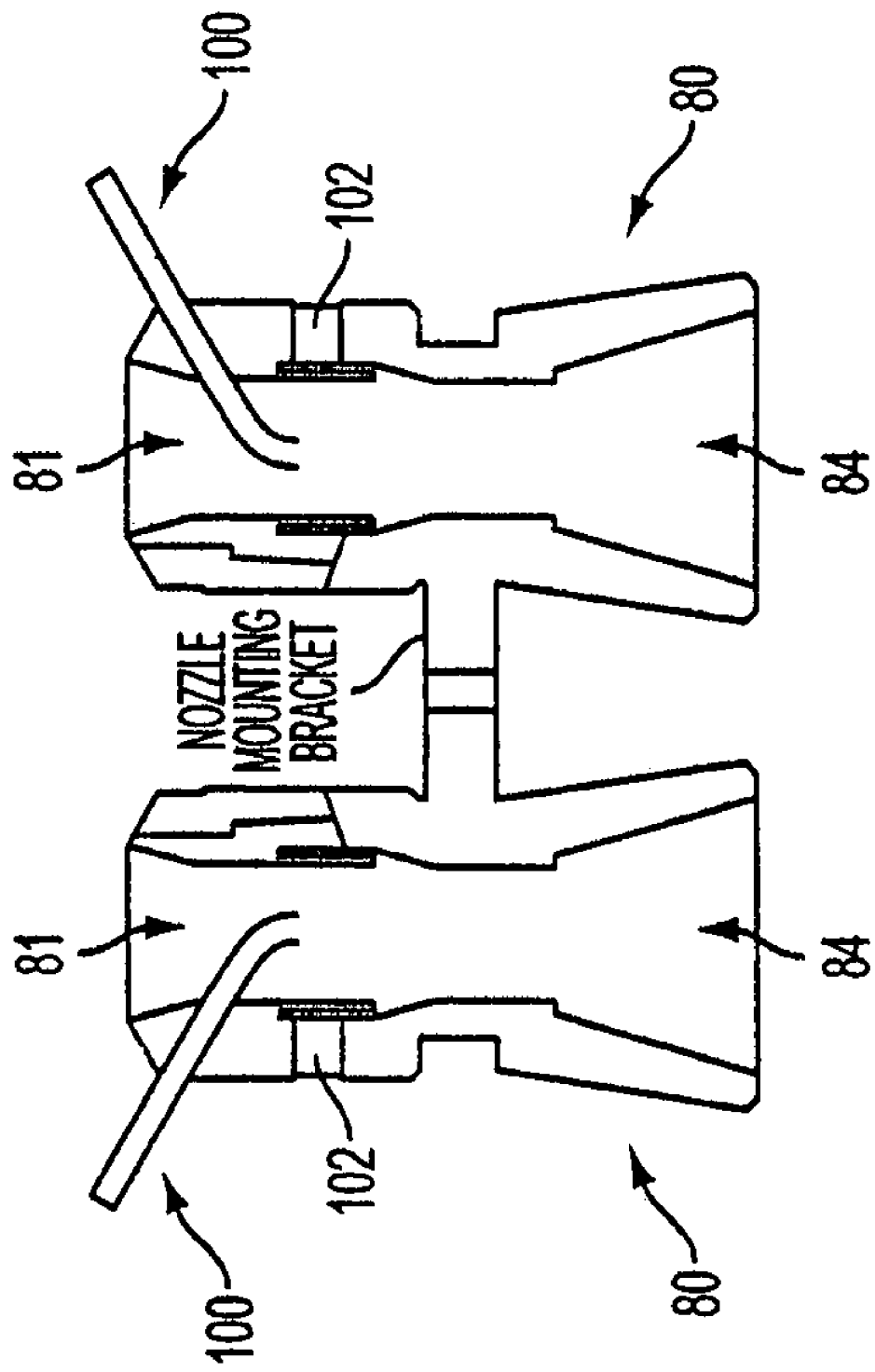
FIG. 7A is a cut away in cross section of a pair of venturi apparatus.

As shown in FIG. 7A, venturi 80 can include a port 100 for introducing binder, a fiber port 81 (sometimes referred to herein as an inlet) for introducing fiber (cut fiber glass, carbon fiber, polyester fiber, acrylonitrile fiber, aramid fiber (Kevlar brand fiber), and/or HMWPE, chopped or cut to a desired length(s)), a port 102 for introducing a pressurized carrier gas, and nozzle 84. By present preference, in operation, the binder is delivered through a binder inlet 100, preferably into approximately the center of a fiber stream before the constriction in the central passage way of venturi 80. Due to the venturi effect, venturi 80 can pull the fiber reinforcement from a fiber source, such as chopper gun operatively connected to venturi 80, the fiber and binder are admixed in venturi 80, and then propelled (expelled) from venturi 80 through nozzle 84 by the carrier gas. The expelled material passes through a heating zone to be heated on its way towards the target surface, which can be a prepared surface of a mold tool. In this embodiment, a heating zone can be formed downstream of the fan nozzles 84 about a region where flame from the burners 85 and 86 is thrown. The adhesive mixture of fibers/binder passes through the heating zone (FIG. 9). Presently, a separate carrier gas stream is preferably used and is introduced through port 102. However, variations in venturi design and operation are within the scope of the invention. For instance, the binder can also be introduced into venturi 80 through port 102 with forced carrier media, such as ambient air or other suitable gas, and this carrier media can, if desired, be used as a carrier gas for venturi 80. The fibers can also be pulled or expelled from a chopper gun or fiber source by a carrier media, such as an air stream, into the fiber port 81. In either case, the carrier gas, its rate of flow, and the like are preferably subject to appropriate process controls, such as computer controls, including flow regulators. An end effector 22 can have one or more venturi 80 or another configuration of venturi 80. A venturi 80 is an effective and efficient means for delivering an adhesive combination of fiber with binder through a heating zone before being deposited on a surface 16.

The rate of media flow through venturi 80 out nozzles 84 is a parameter affecting the dwell time of the fiber/binder mixture (sometimes called mixture 14) in the heating zone 42 and thus the qualities of the perform. Accordingly, the velocity of gas flow through venturi 80 can be monitored and controlled by suitable process controls when the end effector 22 is in operation. Or, for instance, the flow rates can be manually set, in which case the flow rate will be measured and dwell time ascertained based on the flow rate through the heating zone. Thus, if a binder is introduced into venturi 80 with a binder carrier gas, the binder supply can be shut off and binder carrier gas allowed to flow through venturi 80. Similarly, if fibrous reinforcement, or any other material, is propelled into a venturi 80 with a gas, the fiber and all other material supply can be shut off and its carrier gas allowed to flow through venturi 80. The velocity of all "carrier gas" through the venturi 80 can be monitored and measured from which a dwell time in the heat zone can be calculated or estimated and the flow rate(s) set manually or adjusted by process controls. The dwell time in heating zone 42 establishes a thermal treatment suitable for the binder(s) in the fiber/binder mixture so that when deposited on the surface 16, such as a mold tool, the fiber/binder mixture is at least more capable of retaining its shape and position without undesired sagging, slumping and the like. Inadequate dwell time can lead to poorly adherent deposited materials and thus an inferior preform. It will be appreciated that the parameters may, in principle, also be ascertained for a particular process combination by conducting appropriate test runs.

Figure 8A:
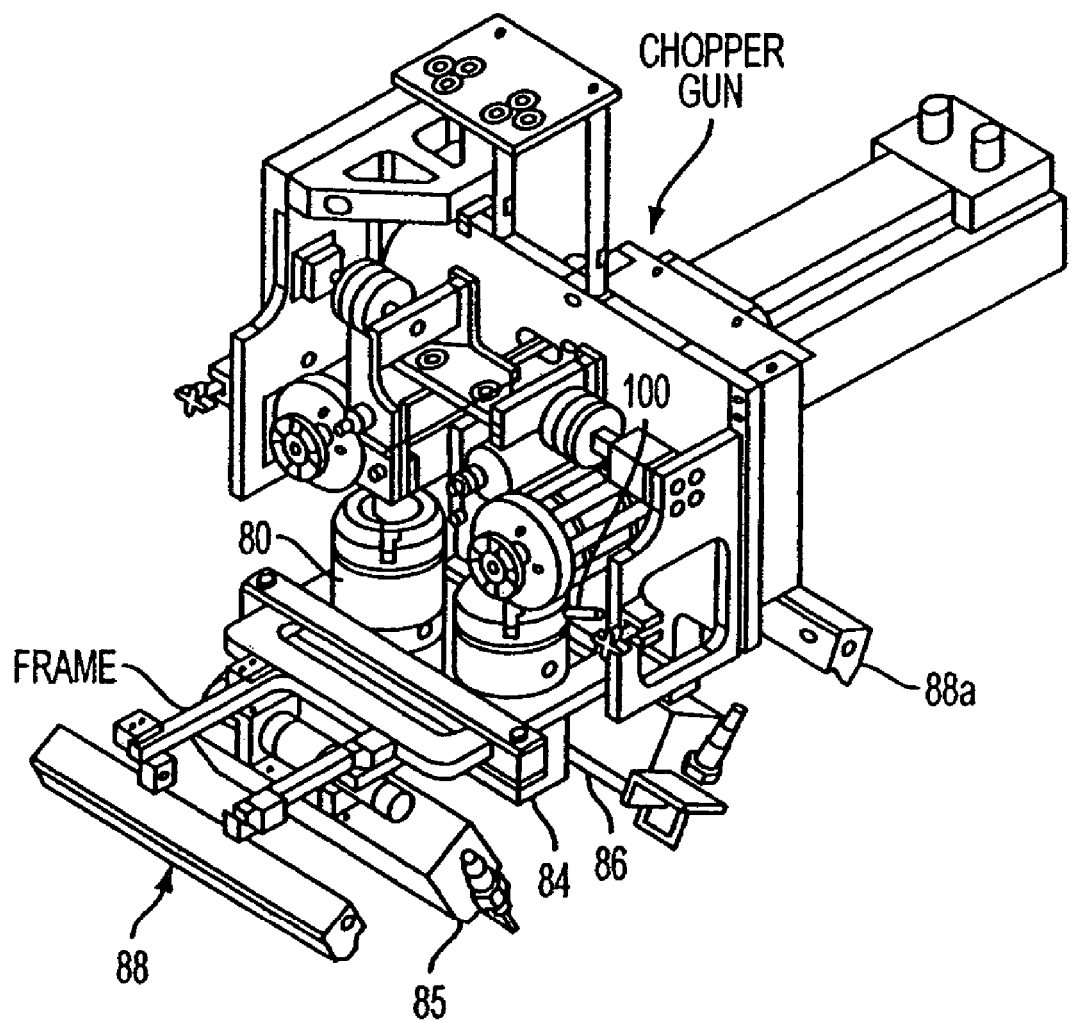
FIGS. 8a and 8b and FIGS. 8c and 8d are respectively a partial view of a chopper gun assembly mounted on an end effector of FIG. 6 and a partial view of a chopper gun detached from an end effector of FIG. 6.
Figure 8B:
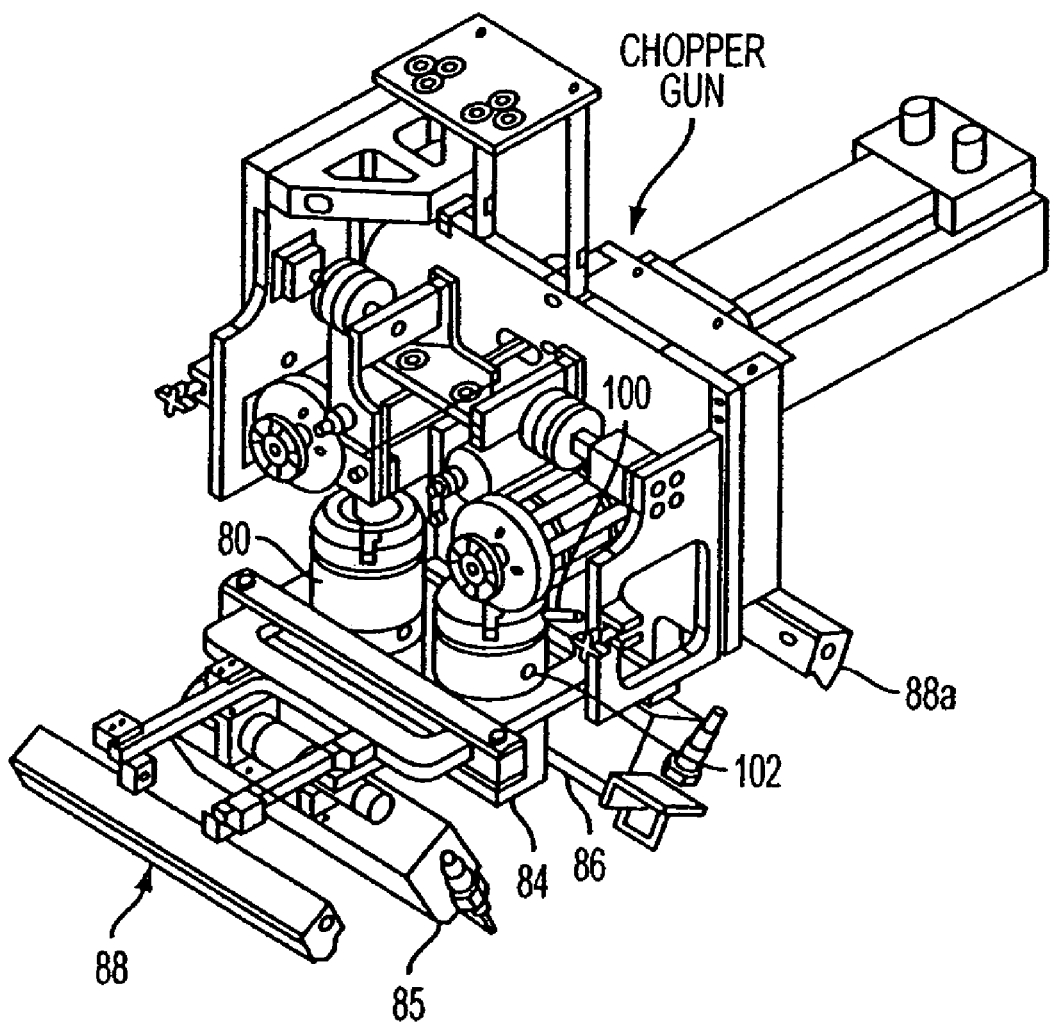
Figure 8C:
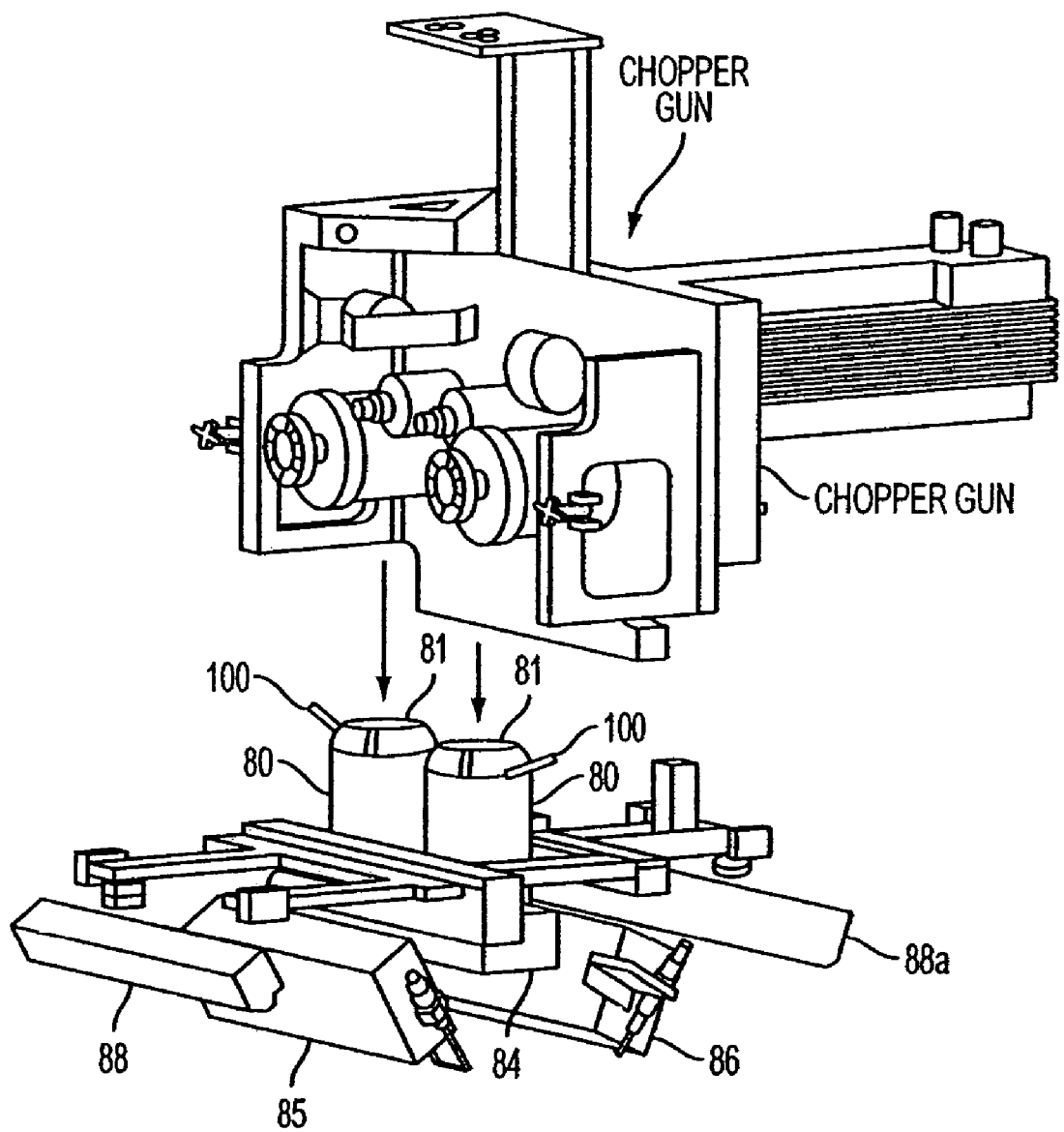
Figure 8D:
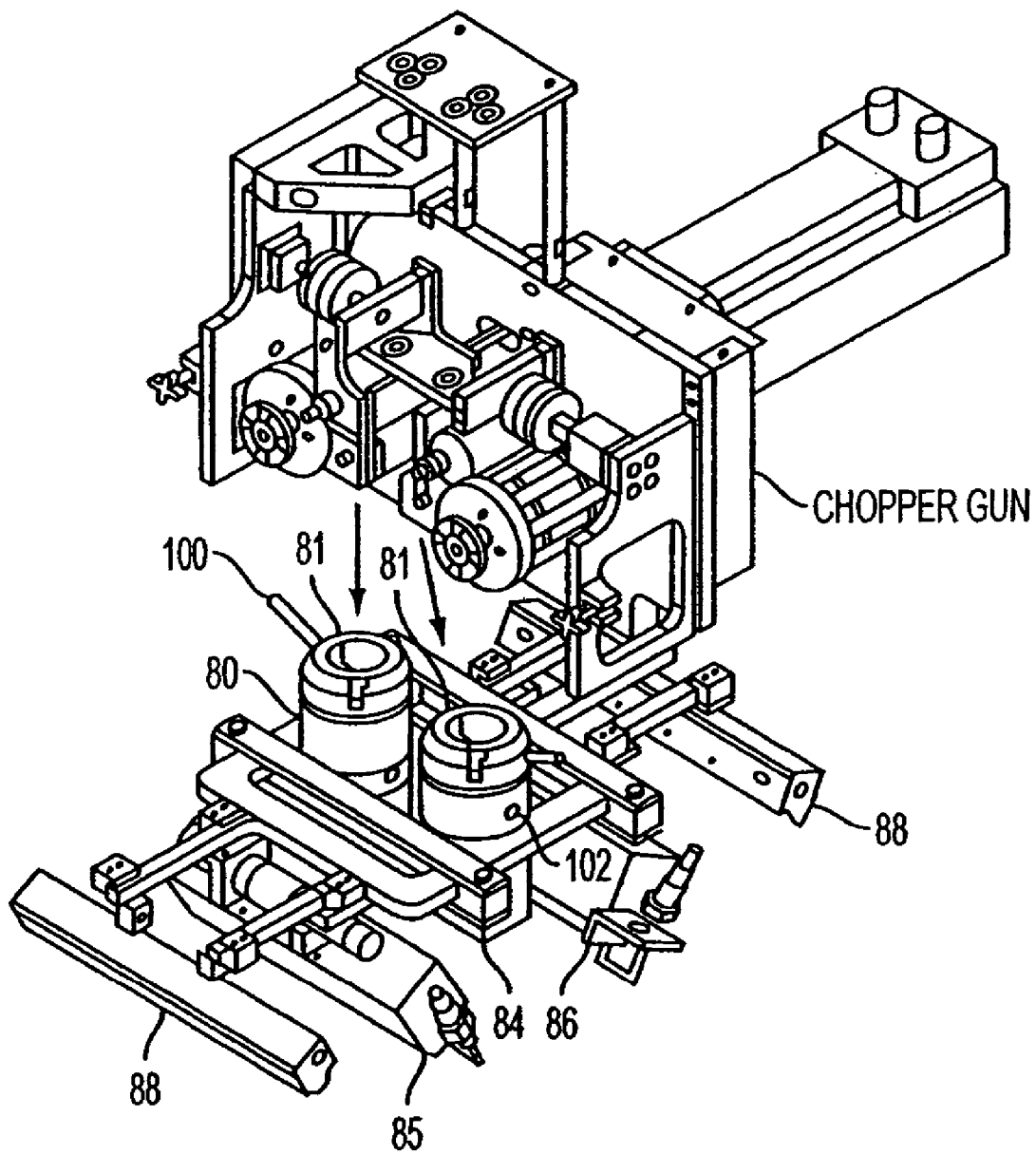

In FIGS. 8a-8d show an end effector of FIG. 6 in which guide elements 89 are not installed with a chopped gun assembly. FIGS. 8a and 8b depict end effector 22 in operative connection with a chopper gun and FIGS. 8c and 8d depict end effector 22 and a chopper gun separated to show how they may be connected.

In FIG. 9 an end effector 22 on a robotic arm 20 is shown in which a stream of material propelled through nozzle 84 passes through a heating zone established by the flames from burners 85 and 86. The stream of reinforcement and binder propelled from a fan nozzle 84 passes through or by a heating zone established by the flame from the burners before being deposited on a surface 16 (not shown).

Figure 10:
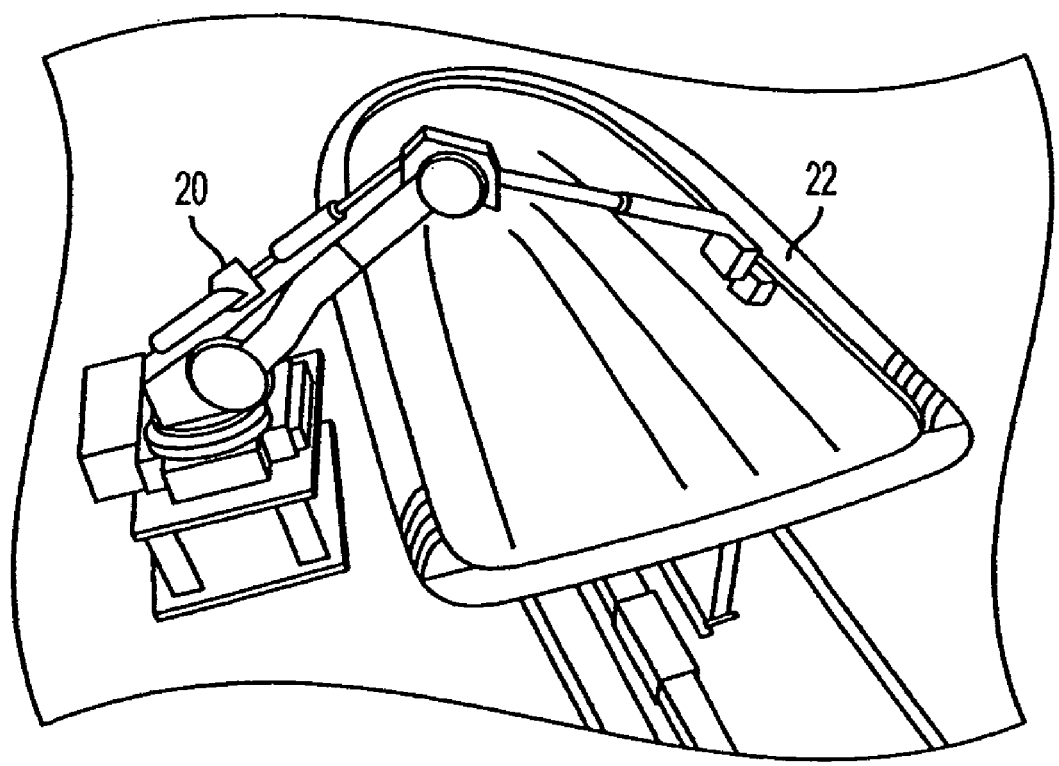
FIG. 10 depicts an end effector mounted on a robotically controlled arm being used in making a preform for a boat hull.

End effector 22 on a robotic arm 20 can be controlled as shown in FIG. 10 to apply (spray deposit etc.) fiber/binder in a pre-selected pattern. More particularly, FIG. 10 shows a robot arm 20 with an end effector 22 being applied in a controlled pattern to form a preform in a first mold. The arrows depict an exemplary pattern of deposited material corresponding to the pre-selected traverse of end effector 22 over the surface. The robot arm is preferably under process controls, such as computer programming or the like.

Figure 11:
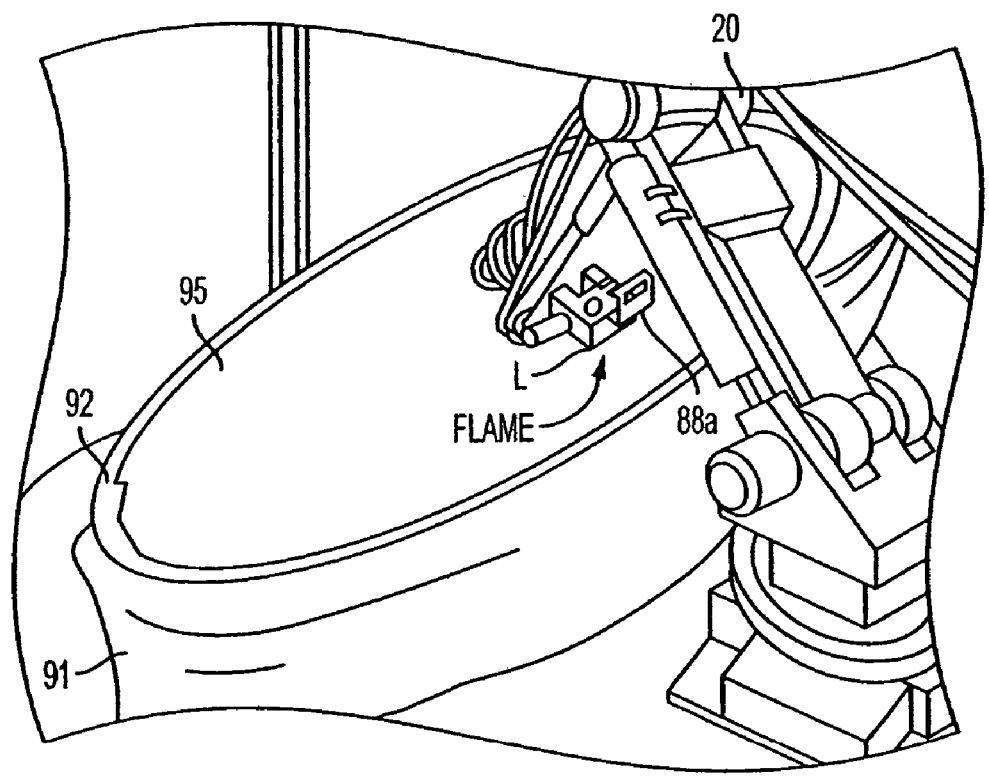
FIG. 11 photographically depicts a robotically controlled arm having an end effector being used in applying fiber/binder in to a gel coated mold tool.

FIG. 11 illustrates a computer controlled robotic arm 20, an end effector 22 (with air curtains), the flange 92 of a first mold tool 90, a skirt 91 about the exterior of the first mold tool 90. In this embodiment, the first mold tool 90 can have a gel coat on the molding surface and, optionally barrier coat(s) and/or reinforcement layer(s) laid over the gel coat, before the fiber/binder is sprayed to form the boat hull preform 95 as shown.

Figure 12:
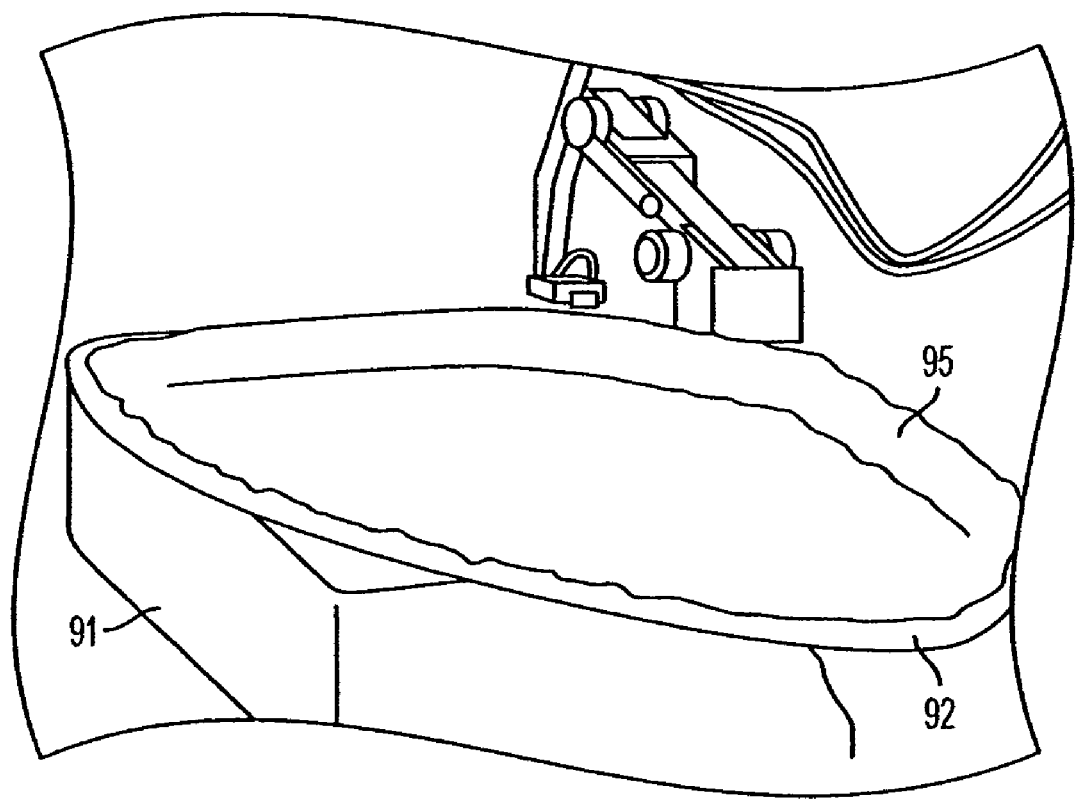
FIG. 12 photographically depicts a boat hull preform, obtained in a first mold tool after completing fiber/binder application according to FIG. 11.
Figure 13:
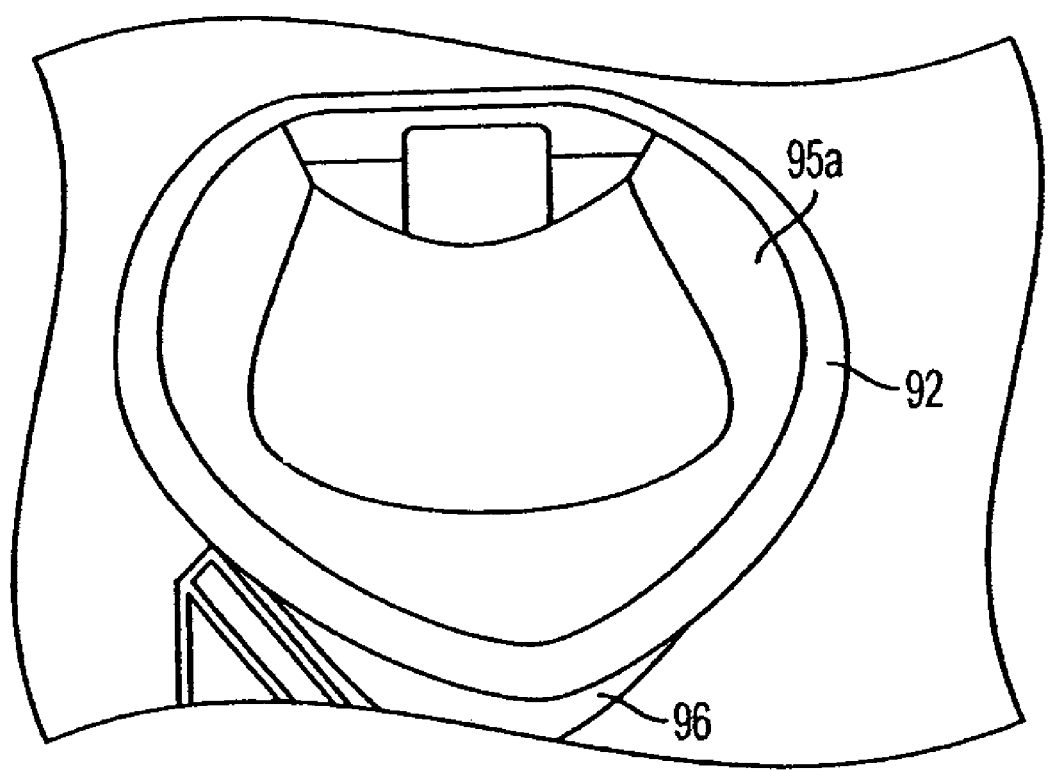
FIG. 13 photographically depicts a boat hull preform in a first mold tool in which the perform is trimmed for subsequent fabrication to a finished composite molded article.

FIG. 12 and FIG. 13 show, respectively, a preform 95 obtained after completing the fiber/binder application with slight over spray of material (FIG. 12) protruding over the flange 92 (not seen), and the trimmed preform 95a in the first mold tool 90 (FIG. 13) with the flange 92 clear. In FIG. 13, the protective skirt 91 has been removed to show a portion of support structure 96 for first mold tool 90.

Figure 14:
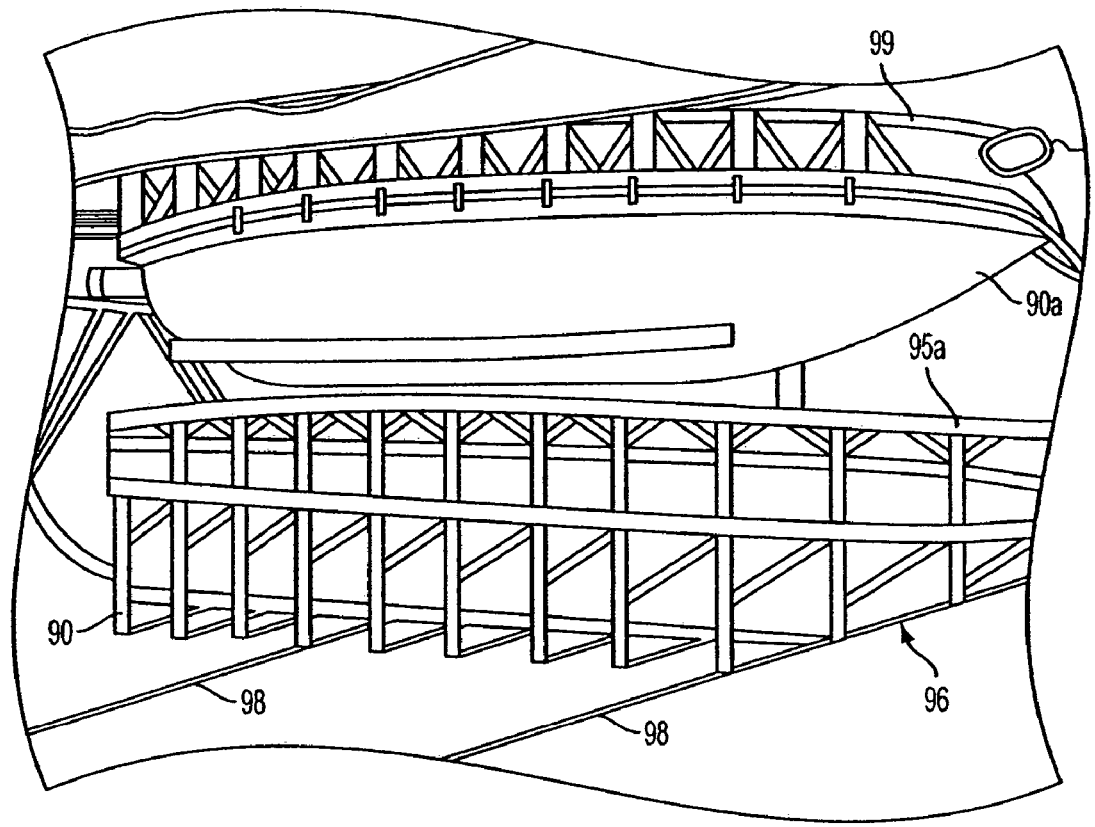
FIG. 14 photographically depicts a trimmed boat hull preform in a supported first mold tool with a matching second mold tool shown in an open position, before initiating resin transfer molding to manufacture a composite molded article.

FIG. 14 shows a trimmed preform 95a in a first mold tool 90 having support structure 96 and in open relationship to matching second mold tool 90a. The second mold tool 90a can be closed, e.g. clamped or be vacuum sealed, in operative molding relationship with first mold tool 90 to define a mold cavity containing preform 95a and resin can be introduced into the cavity of the closed mold. A gantry or frame 99 with a lift capability is shown supporting mold tool 90a in open, opposed relationship to mold tool 90. Gantry or frame 99 can lower mold tool 90a to mold tool 90 to establish a closed mold. It will be appreciated that the gantry or frame may have extendible and retractable (or even rotatable) armature support for mold tool 90a to more readily permit, among other things, its spatial adjustment over a mold tool 90 prior to forming the closed mold tool. Mold tool 90 with a formed-in-place preform 95a (a boat hull) has been moved between work stations. Support structure 96 can include or be operatively connectable to a transport system 98 so that after preform 95a is prepared in a work station, it can be transported while remaining in the mold tool 90 within the factory to another work station and positioned in operative relationship to receive other treatment, such as in this case being positioned relative to mold tool 90a. Transport system 98 includes rails as shown. It will be appreciated that other suitable apparatus for shifting work pieces (mold tools etc.) between different work stations in factory can be employed as shown in FIG. 15. For smaller work pieces a manually movable apparatus for conveying a mold tool with preform from one to another work station. It is in principle possible to have the gantry or frame 99 also on tracks or connected to other suitable transport mechanism to permit movement within a factory. It will be appreciated that the transport system or mechanism may also be process controlled.

FIG. 15 shows the surface 16 of a first mold tool 90 (not shown) and a pair robotic controlled arms 20 and 20a, end effector 22, and a carriage (roller as illustrated). Each end effector 22 can deposit the same or a different fiber/binder mixture. By preference, each is also process controlled. Robotic arms 20 and 20a can each more readily extend their respective end effector 22 across a surface 16, such as a mold tool 90, to a far side away from their respective base 20b and 20c to more readily permit even deposition of fiber/binder to a respective opposing portion of surface 16, such as a mold tool 90, especially if such opposing portion has a complex shape or steep portion.

As will be understood, preform 18 or 95a can be used to fabricate a composite molded article in subsequent processing using resin transfer molding (RTM), VARTM (vacuum assist resin transfer molding), compression molding process, structural-reaction injection molding (S-RIM), or, for instance, in a vacuum infusion process. Heat and/or pressure molding steps can be employed in fabricating a composite article from a preform.

Of course, any suitable end effector 22 can be used, provided that the appropriate mixing and heat control can be employed. As can be understood from above, preform 18 or 95a can be made with different properties by controlling, for instance, the heating zone, the temperature of the binder, reinforcement and the degree to which reinforcement fiber is chopped or cut, and the distance between end effector 22 and support surface 16. For example, the material 14 or a fiber/binder mixture as in FIG. 9 can be controlled so that the mixture has sufficient tackiness when applied to support surface 16 so that it quickly solidifies. Alternatively, mixing can be controlled so that the mixture applied (hitting) support surface 16 is sufficiently tacky to adhere to support surface 16 but remain moldable so that it can be pressed or further shaped.

As described herein, control of the various elements and parameters can be manual or automated. If automated, a system can be provided using known programming techniques in a controller or processing apparatus, such as a microprocessor. Process control, especially robotic control, can be achieved by robot control signals, process sensor feedback signals, process material regulation, material selection and preset specifications. These and other concepts are also embodied within the term computer controlled, or the like. Programming packages are commercially available that can be used to program a controller for a robotic arm 20 or chopper gun. Using process control for a robotic arm helps ensure correct orientation of end effector 22, attaining an optimal concentration of fiber over surface 16 or other surface to which the material is deposited with minimal deviations and minimal variation between like-made preforms.

Although mentioned elsewhere, the parameters that affect preform fabrication include the level of control of the heat source or flame, the velocity at which the flame, binder and chop are introduced, the ratio between these elements, and the distance of end effector 22 from a support surface 16, which can be a prepared surface of a mold tool 90 or 90a as the case may be. For example, if a less viscous mixture is desired, a binder can be selected that is less viscous when heated to a higher temperature. By this method, application of adhesive mixture can be controlled. Adhesive mixture also does not need to be applied at a high velocity and pressure. Because an adhesive mixture, such as a mixture 14, adheres to support surface 16, it may be draped over a surface 16 (or mold tool 90) to achieve different qualities in a preform 18 or preform 95a.

As mixture 14 can stick to support surface 16 due, for instance, to the conditioning during the mixing operation, no additional methods of holding the reinforcing material 46 in place are necessarily required. This eliminates the need for any vacuum or plenum assembly over the mold. Further, since a low pressure flame velocity is used, the problem of blowing reinforcing material off of support surface 16 or to different places on support surface 16 is not present. Additionally, since mixture 14 can be closely controlled, different shapes and thickness of preform 18 can be achieved. However, as described herein, the adhesive mixture advantageously receives cooling from a gaseous cooling curtain, especially if the surface 16 is or has a tall vertical or near vertical section, such as the freeboard of a large boat hull.

Thus, it can be seen that the apparatus, the method and their variations in accordance with this invention allows complicated shapes to be easily molded directly on a forming surface, such as a mold tool, thus simplifying the process of making preform 18 or 95a and also the ultimate molding processes in which preform 18 or 95a is used. Also, a one piece preform, even in large shapes such as boat hulls, can be formed using the preform without first removing the preform from its mold tooling. This reduces labor costs and production time and can result in a stronger composite part.

Preform 18 or 95a formed in accordance with any of the above embodiments can be used in a molding process to make a composite structural part. For example, preform 18 or 95a may be used in a vacuum molding process in which resin is applied to preform 18 or 95a with the assistance of vacuum and then the composite structure is cured. Alternatively, a molding material, such as resin, can be applied to preform 18 or 95a and, then, heat and/or pressure can be applied to form the composite part. Also, simply heat and/or pressure can be applied to preform 18 or 95a to compress mixture 14 and form a part. The pressure can include reduced pressure in a vacuum bagging apparatus. The direct formation of a composite is particularly suited for the pre-preg embodiment. Pre-preg embodiment may find particular application in aerospace and non-civilian applications.

The present invention offers a composite part maker a cost advantageous process to apply fiber reinforcement directly into existing gel-coated mold tool to fabricate a preform without having to remove the preform from its associated mold tooling in order to make the final composite molded article. It will be appreciated that the preform can have a shaped surface corresponding to a desired shaped surface of the finished composite molded article.

For example, a preform made according to this invention could be used in a molding process that includes the following steps. After the preform is solidified, the preform remains in its mold (or, is placed in a suitable mold) and a molding material, such as resin, is applied. A gel coat or the like can, if desired, be formed first in the mold before a preform is placed in the mold. The mold can be an open mold or a closed mold. In the latter case, the molding tool would usually be closed prior to introduction of resin into the mold cavity. Then, after the mold is completely filled, the resin is cured. The article can then be removed from the mold and used in that state or further treated or shaped to suit a manufacturing process. Before the introduction of the molding material, the preform could also be shaped prior to its complete solidification, cut, or heated and shaped to conform to desired molding conditions. Additionally, separate preforms could be used together to form a structural base prior to molding.

More particularly, in a manufacturing embodiment, a boat hull, boat deck or other composite part can be prepared as follows. A first molding tool is prepared. Preparing the mold surface of the first mold tool can include cleaning and, as necessary, providing a coating of a release agent. The prepared mold tool can be gel coated. For instance, if a surface of a finished composite part formed by the first mold surface needs to have a decorative or protective coating, a so-called powder coating can be applied to the molding surface of the prepared first mold. Or, such surface it can, if desired, be only primed. A gel coating or powder coating may be omitted if no specific surface coating is required on either a preform or final composite. If a gel-coat is applied, it is preferably allowed to cure. Barrier coats, as needed or desired, can be applied over the gel-coat. If the first mold tool has a section, area or region having a tight radius or complex curvatures, fiber strands or air fluffed fiber strands, or strips of any other reinforcement can be laid up, if desired, over any coating (gel coat or barrier layer(s)) in the tight radius or on the complex curvature to minimize fiber bridging during later process steps. Shorter length fibers can also be applied with an end effector 22 into these tight corners or complex curvatures to minimize fiber bridging. The first mold tool and its support (if support is provided) are positioned and fiber/binder are applied directly to form a mat of deposited material onto the cured gel-coat preferably using at least one robotically controlled device equipped with an end effector 22. The robotically controlled device is preferably operatively equipped with an end effector 22 having venturi 80 and cooling curtain means 88 and/or 88a. The fiber/binder mixture, such as in FIG. 9 or mixture 14, can be applied according to a selected pattern, such as shown in FIG. 10, as deposited material and can be applied to form layer(s) in a mat of fiber/binder. The mat preferably has open interstices between and among fibers. Robotically applied material is preferably computer controlled to assure ready, repeatable fabrication of a particular preform design. For instance, fiber chop, binder feed, spray patterns, layering, flame temperature, cooling air (cooling curtain), and distance from the substrate are among the features that can be computer controlled. It will be appreciated, however, that the fiber/binder can be applied by manually controlling an end effector 22, but this could introduce process variation and cause reduced consistency in both the process and in the finished composite structure. It will also be appreciated that different fiber materials can be applied by end effector 22 or a plurality of end effectors 22 in order to form differing layers or regions of a preform with different composite properties. For example, in a multi-layered preform, different layers can in principle have different fiber reinforcement or different fiber orientation(s). A carbon fiber layer can be applied on top of the e-glass layer to replace in whole or in part an engineered fabric that may otherwise be laid into the mold tool during the process of fabricating a preform. Of course, application of carbon fiber alone, another fiber(s) alone, e-glass (fiber glass etc.) alone or any in combination is contemplated by our invention. Depending on the composite structure to be produced, other engineered fabrics can be laid in as desired before, during, or after the fiber/binder are applied. It will be appreciated that in manufacturing certain boat hulls or other marine composites, additional structural elements, such as stingers, bulkheads, flooring support, and the like, can be introduced into the first mold as the preform is being formed or afterwards. Such additional structural elements can be used to define storage areas or, for instance, compartments in which a marine motor or fuel tank can be installed. Stringers, bulkheads, other structural elements and the like, such as disclosed in U.S. Pat. No. 5,664,518, the complete disclosure of which is incorporated herein by reference, can be used. Obviously, the preform fabrication method could be adapted to fabricate pre-glassed structural elements themselves.

Closed cell shaped foam or other structural material can be laid in to provide additional preform structure, such as a bulkhead, stringer etc., even without being pre-glassed or pre-fleeced with fiber-reinforcement, preferably before the fiber/resin completely cures. The foam or other structural material can have a surface(s) prepared with adhesive or binder compatible with the deposited material in a preform. The fiber/binder application can be interrupted to permit installation of additional structural element(s), in which case the fiber/binder application can be resumed, as desired, to provide a layer(s) deposited over the added structural element(s) to make it an integral and relatively seamless part of the preform. After a material is deposited on the surface, especially if the surface has a steeply sloped or a tall vertical section, an end effector 22 (FIGS. 6 and 7) having manifolds 88 and/or 88a (e.g., at least one cooling curtain means) applies a curtain of gaseous cooling media to the just deposited material to avoid sagging, slumping, sloughing off or other separation of the deposited fiber/binder from the surface or from another intervening layer deposited on the surface. After the fiber/binder application is completed and cures, the preform obtained is trimmed as needed and the flange of a first mold tool etc. is cleaned as necessary. In a preferred embodiment, a closed mold system is used with the first mold tool being a female mold and a second mold tool being a matching male mold wherein one or both of the first and second molds is closable with respect to the other so as to define there between a mold cavity. Depending on the molding process, in a subsequent step resin can be injected or infused into the mold cavity. In manufacturing a boat, any conventional resin can be used, including thermoplastic resin. The resin cures, the mold is opened and the thus produced composite (boat hull in this example) is removed.

It will also be appreciated that a composite structure, such as a boat hull, can be prepared with a finished exterior exposed hull surface and a finished interior (deck, cockpit etc.) exposed surface. In this embodiment, the general procedure can be the same as above but modified so that the molding surface of the second mold is coated with release agent, gel-coated or finish coated before it is closed with the first mold tool and the resin is introduced into the cavity defined by the closed mold tools. The second mold can be contoured so that the finished composite can have the desired interior surface. In principle, the general procedure can be modified further to fabricate a composite formed from a preform in the first mold and a preform fabricated in the second mold. When the matching first and second molds are closed, the injected or infused resin bonds the two preforms together. In this and other embodiments, the resin can, in principle, be foamable for use in a closed or open mold application.

The use of an end effector 22 in accordance with the present invention can be combined with so-called zero injection pressure resin transfer molding ("ZIP RTM molding"). The latter molding process is generally described in Composite Fabrication, pages 24-28 (March 2003), the complete disclosure of which is incorporated herein by reference. For instance, an end effector 22, preferably one with curtain(s) of cooling media and using a venturi for fiber and binder supply, can be used to form a layer(s) of fiber/binder instead of hand laying in the fiber mats and binder. Although vacuum can be applied to frames in a ZIP RTM molding process, it is not a requirement in the present embodiment. For instance, a lower molding tool according to a ZIP RTM molding process can be used as a first mold in this embodiment because it is similar to an open mold, but advantageously lighter mold tooling becomes feasible.

It will be appreciated that a composite structure can be prepared in which instead of a gel coating, a skin layer can be first formed in a first mold and, optionally, one or more barrier layers (solid and/or foamed) can be formed on the exposed surface of the skin layer, and fiber/binder layer(s) can be applied over the barrier layer(s) using an end effector 22 in accordance with the present invention. The remainder of the procedure can be conducted as described above. In a further variation of this and the other embodiments, all or part of the resin introduced into the closed mold can be a foamable resin.

It will be appreciated that manifold 88 and/or 88*a* can be selectively controlled so as to supply a warmer or hot air curtain, if needed, or one can supply a warm or hot air curtain and the other a cooling air curtain. In this variation, each manifold can be appropriately process controlled so that an air curtain of a selected temperature can be applied.

Various parts can be made, as noted above, that are useable in the marine industry or other industries that utilize fiberglass reinforced articles. For example, partial hulls, boat decks in whole or part, hatches, covers, engine covers, marine accessories and the like may be manufactured using preforms made in accordance with this process. Similarly, other marine vessels such as personal watercraft may be manufactured with parts made from this process, including for example, engine covers, hulls in whole or part, hatches and the like. Parts made according to this process would also be usable in the automotive industry to manufacture both interior and exterior components or body parts for vehicles. The use of such parts is not limited to vehicles as such parts could be used in any structural article, such as a storage container or construction component.

The complete disclosure of U.S. application Ser. No. 10/038,771, filed Jan. 8, 2002 is incorporated herein by reference.

It is to be understood that the essence of the present invention is not confined to the particular embodiments described herein but extends to other embodiments and modifications that can be encompassed by the appended claims.

What is claimed is:

1. An end effector for connection to a robot arm for applying a heated adhesive mixture of a binder and a reinforcing fiber to a surface, said effector comprising:
   a frame support;
   at least two spaced burners mounted on the frame to produce respective flames, with the two flames being oriented to heat a region disposed therebetween, wherein the at least two spaced burners are elongated, are symmetrically disposed on the frame, extend parallel to one another and are inclined inwardly;
   a nozzle arrangement for dispensing a mixed stream of binder and reinforcing fiber into the heated region to cause heating of the mixture;
   a respective manifold associated with each of the at least two spaced burners and having an inlet for a cooling medium connected thereto; and,
   a respective shield member disposed between each manifold and an associated burner to minimize interaction between the stream of cooling medium and the heated region.

2. The end effector according to claim 1 connected to the robot arm.

3. The end effector according to claim 1 wherein the manifolds are elongated, are symmetrically disposed on the frame, extend parallel to one another, and extend along the length of the associated at least two spaced burners to produce a curtain of cooling medium.

4. The end effector according to claim 3 wherein the shields are elongated, are symmetrically disposed on the frame, and extend parallel to one another.

5. The end effector according to claim 4 wherein the nozzle arrangement includes a venturi tube mounted on the frame between the at least two spaced burners and having an inlet opening for receiving the reinforcing material at one end and a spray pattern outlet nozzle for the mixed stream at its other end, an inlet port extending into the interior of the venturi tube for the introduction of a liquid binder, and an air inlet to the interior of the for the introduction of a carrier gas.

6. The end effector according to claim 5 wherein the outlet nozzle has an elongated shape extending parallel to the extension direction of the at least two spaced burners.

7. The end effector according to claim 6 wherein a pair of said venturi tubes are provided with their output nozzles being axially aligned in the extension direction of the at least two spaced burners.

8. The end effector according to claim 1 wherein the nozzle arrangement includes at least one venturi tube mounted on the frame between the at least two spaced burners, and having an inlet opening for receiving the reinforcing material at one end and a spray pattern outlet nozzle for the mixed stream at its other end, an inlet port extending into an interior of the at least one tube for the introduction of a liquid binder, and an air inlet to the interior of at least one the venturi tube for the introduction of a carrier gas.

9. The end effector according to claim 8 wherein the outlet nozzle has an elongated shape extending parallel to the extension direction of the burners.

10. The end effector according to claim 9 wherein a pair of said venturi tubes are provided with their output nozzles being axially aligned in the extension direction of the at least two spaced burners.

* * * * *